(12) United States Patent
Kaneko et al.

(10) Patent No.: US 11,025,877 B2
(45) Date of Patent: Jun. 1, 2021

(54) MULTI-CAMERA SYSTEM, CAMERA, PROCESSING METHOD OF CAMERA, CONFIRMATION APPARATUS, AND PROCESSING METHOD OF CONFIRMATION APPARATUS

(71) Applicant: SONY CORPORATION, Tokyo (JP)

(72) Inventors: Tetsuo Kaneko, Kanagawa (JP); Yasuhiro Iizuka, Kanagawa (JP); Kazuhiro Uchida, Kanagawa (JP); Shigeo Nakatsuka, Tokyo (JP); Shinnosuke Usami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/322,143

(22) PCT Filed: Aug. 2, 2017

(86) PCT No.: PCT/JP2017/028096
§ 371 (c)(1),
(2) Date: Jan. 31, 2019

(87) PCT Pub. No.: WO2018/030238
PCT Pub. Date: Feb. 15, 2018

(65) Prior Publication Data
US 2019/0191139 A1    Jun. 20, 2019

(30) Foreign Application Priority Data

Aug. 9, 2016  (JP) .............................. JP2016-156717

(51) Int. Cl.
*H04N 5/232*    (2006.01)
*H04N 5/247*    (2006.01)
(Continued)

(52) U.S. Cl.
CPC ....... *H04N 9/8205* (2013.01); *H04N 5/23203* (2013.01); *H04N 5/247* (2013.01);
(Continued)

(58) Field of Classification Search
CPC ........... H04N 5/23203; H04N 5/23206; H04N 5/268; H04N 5/4403; H04N 5/77;
(Continued)

(56) References Cited

U.S. PATENT DOCUMENTS 8,018,497 B2 *   9/2011  Muraki ................. H04N 5/235
                                                            348/221.1
10,432,897 B2 * 10/2019  Carey ..................... H04N 7/18
                                                              386/116
(Continued)

FOREIGN PATENT DOCUMENTS

CN    101668160 A    3/2010
CN    101751677 A    6/2010
(Continued)

OTHER PUBLICATIONS

International Search Report dated Apr. 24, 2018 in PCT/JP2017/028096, 4 pages.
(Continued)

*Primary Examiner* — Marly S Camargo
(74) *Attorney, Agent, or Firm* — Oblon, McClelland, Maier & Neustadt, L.L.P.

(57) ABSTRACT

A multi-camera system, including a first camera apparatus, a second camera apparatus, and an information processing apparatus. The information processing apparatus includes a communication interface and processing circuitry. The processing circuitry is configured to receive a predetermined user input and in response to the predetermined user input, send, via the communication interface, a first control signal to the first camera apparatus that captures a first video, and
(Continued)

send, via the communication interface, a second control signal to the second camera apparatus that captures a second video. The first control signal causes the first camera apparatus to assign first unique identifiers to frames of the first video captured by the first camera apparatus. The second control signal causes the second camera apparatus to assign second unique identifiers to frames of the second video captured by the second camera apparatus.

20 Claims, 13 Drawing Sheets

(51) Int. Cl.
| | | |
|---|---|---|
| | *H04N 5/268* | (2006.01) |
| | *H04N 9/82* | (2006.01) |
| | *H04N 5/77* | (2006.01) |
| | *H04N 21/422* | (2011.01) |
| | *G11B 31/00* | (2006.01) |
| | *G08B 13/196* | (2006.01) |
| | *H04N 5/91* | (2006.01) |

(52) U.S. Cl.
CPC ............... *H04N 5/268* (2013.01); *H04N 5/77* (2013.01); *H04N 5/91* (2013.01); *H04N 21/42204* (2013.01)

(58) Field of Classification Search
CPC ............ H04N 5/91; H04N 5/76; H04N 7/181; H04N 7/188; H04N 9/8205; H04N 21/40204; G11B 31/006; G06K 19/0723; G08B 13/19693
USPC ... 348/207.1, 207.11, 207.99, 208.99, 211.5, 348/211.99, 211.2, 211.14, 143, 159, 348/14.05, 114, 161, 460; 386/223, 248, 386/210, 231, 234, 235, 227, 249; 235/101, 380, 462.01–462.15
See application file for complete search history.

(56) References Cited

U.S. PATENT DOCUMENTS

| | | | | |
|---|---|---|---|---|
| 2002/0131768 | A1* | 9/2002 | Gammenthaler | ........ H04N 7/52 386/107 |
| 2005/0151852 | A1* | 7/2005 | Jomppanen | ............ H04N 5/225 348/218.1 |
| 2005/0253926 | A1* | 11/2005 | Chung | ................... H04N 57/18 348/116 |
| 2010/0195978 | A1 | 8/2010 | Ekchian et al. | |
| 2013/0222640 | A1* | 8/2013 | Baek | ...................... H04N 5/232 348/231.99 |
| 2014/0211027 | A1* | 7/2014 | Worrill | ................... H04N 5/232 348/143 |
| 2015/0043886 | A1 | 2/2015 | Bang et al. | |
| 2015/0078727 | A1* | 3/2015 | Ross | ................... H04N 5/9201 86/227 |
| 2015/0195483 | A1 | 7/2015 | Miller et al. | |
| 2017/0318274 | A9* | 11/2017 | Feinson | ............... H04N 9/8227 386/223 |

FOREIGN PATENT DOCUMENTS

| | | |
|---|---|---|
| EP | 2 840 558 A2 | 2/2015 |
| JP | 2004-253872 A | 9/2004 |
| JP | 2012-39558 A | 2/2012 |
| WO | WO 2016/061516 A1 | 4/2016 |

OTHER PUBLICATIONS

Office Action dated Feb. 4, 2020 in corresponding Japanese Patent Application No. 2016-156717, 5 pages.
Office Action dated May 26, 2020 in corresponding Japanese Patent Application No. 2016-156717; 6 pages.

* cited by examiner

[Fig. 11]

MULTI-CAMERA SYSTEM, CAMERA, PROCESSING METHOD OF CAMERA, CONFIRMATION APPARATUS, AND PROCESSING METHOD OF CONFIRMATION APPARATUS

CROSS REFERENCE TO RELATED APPLICATIONS

This application claims the benefit of Japanese Priority Patent Application JP 2016-156717 filed Aug. 9, 2016, the entire contents of which are incorporated herein by reference.

TECHNICAL FIELD

The present technology relates to a multi-camera system, a camera, a processing method of the camera, a confirmation apparatus, and a processing method of the confirmation apparatus.

BACKGROUND ART

In the related art, moving images of an object are captured by cameras at a plurality of angles in order to confirm movements of the object, for example, doing sports practice. A user wants to confirm the moving images immediately after that. In the past, the captured moving images are reproduced by the cameras, respectively. Alternatively, the captured moving images are imported into a device such as a personal computer, and the respective files of the captured moving images are reproduced by the device. To confirm a form of the object at a certain moment, a user wants to pause the moving image, switch the moving image to a moving image taken at a different angle in a short time without stress, and watch the moving image after switching. However, there is no measure to do so.

For example, PTL 1 discloses that a summary content is automatically generated from a plurality of contents for a user to confirm the contents in a short time. According to this disclosure, the summary content is generated by changing a reproducing speed of each content depending on amounts of generated events predefined. However, it is not possible to reproduce the captured contents of an arbitrarily specified time and at an arbitrarily specified angle immediately after capturing the contents.

CITATION LIST

Patent Literature

PTL 1: Japanese Patent Application Laid-open No. 2010-039877

SUMMARY OF INVENTION

Technical Problem

It is desirable to confirm well images captured by a plurality of cameras.

Solution to Problem

In one embodiment of the present disclosure, there is provided a multi-camera system, including a first camera apparatus, a second camera apparatus, and an information processing apparatus. The information processing apparatus including a communication interface and processing circuitry. The processing circuitry being configured to receive a predetermined user input and in response to the predetermined user input, send, via the communication interface, a first control signal to the first camera apparatus that captures a first video, and send, via the communication interface, a second control signal to the second camera apparatus that captures a second video. The first control signal causes the first camera apparatus to assign first unique identifiers to frames of the first video captured by the first camera apparatus. The second control signal causes the second camera apparatus to assign second unique identifiers to frames of the second video captured by the second camera apparatus. Each of the first unique identifiers assigned to the frames of the first video is associated with a different one of the second unique identifiers assigned to the frames of the second video.

In one embodiment, there is provided an information processing apparatus, including a communication interface and processing circuitry. The processing circuitry is configured to receive a predetermined user input and in response to the predetermined user input, send, via the communication interface, a first control signal to a first camera apparatus that captures a first video, and send, via the communication interface, a second control signal to a second camera apparatus that captures a second video. The first control signal causes the first camera apparatus to assign first unique identifiers to frames of the first video captured by the first camera apparatus. The second control signal causes the second camera apparatus to assign second unique identifiers to frames of the second video captured by the second camera apparatus. Each of the first unique identifiers assigned to the frames of the first video is associated with a different one of the second unique identifiers assigned to the frames of the second video.

In one embodiment, there is provided an information processing apparatus, including a communication interface and processing circuitry. The processing circuitry is configured to transmit, via the communication interface, a first unique identifier of a frame of a first video to a first camera apparatus, which captured the first video and receive at least one frame of the first video including the frame corresponding to the first unique identifier from the first camera apparatus in response to the transmitted first unique identifier. Each of the at least one frame of the first video corresponding to a different one of a plurality of first unique identifiers. The processing circuitry is configured to output one or more of the at least one video frame of the first video for display to a user, receive a predetermined user input during the output of the one or more of the at least one video frame of the first video for display to the user, and in response to the received predetermined user input, transmit, via the communication interface, a second unique identifier of a frame of a second video to a second camera apparatus, which captured the second video, the second unique identifier being associated with the first unique identifier of one of the at least one frame of the first video, receive at least one frame of the second video including the frame corresponding to the second unique identifier from the second camera apparatus in response to the transmitted second unique identifier, each of the at least one frame of the second video corresponding to a different one of a plurality of second unique identifiers, and output one or more of the at least one video frame of the second video for display to the user.

In one embodiment, there is provided a non-transitory computer-readable medium storing instructions which when executed by a computer cause the computer to perform a method of controlling cameras to assign unique identifiers to frames of captured video, the method including receiving a predetermined user input; and in response to the predetermined user input, send, via a communication interface, a first control signal to a first camera apparatus that captures a first video, and send, via the communication interface, a second control signal to a second camera apparatus that captures a second video. The first control signal causes the first camera apparatus to assign first unique identifiers to frames of the first video captured by the first camera apparatus. The second control signal causes the second camera apparatus to assign second unique identifiers to frames of the second video captured by the second camera apparatus. Each of the first unique identifiers assigned to the frames of the first video is associated with a different one of the second unique identifiers assigned to the frames of the second video.

In one embodiment, there is provided a non-transitory computer-readable medium storing instructions which when executed by a computer cause the computer to perform a method of playing back video recorded by a plurality of cameras, the method including transmitting, via a communication interface, a first unique identifier of a frame of a first video to a first camera apparatus, which captured the first video; receiving at least one frame of the first video including the frame corresponding to the first unique identifier from the first camera apparatus in response to the transmitted first unique identifier, each of the at least one frame of the first video corresponding to a different one of a plurality of first unique identifiers; outputting one or more of the at least one video frame of the first video for display to a user; receiving a user input during the output of the one or more of the at least one video frame of the first video for display to the user; and in response to the received user input, transmitting, via the communication interface, a second unique identifier of a frame of a second video to a second camera apparatus, which captured the second video, the second unique identifier being associated with the first unique identifier of one of the at least one frame of the first video, receiving at least one frame of the second video including the frame corresponding to the second unique identifier from the second camera apparatus in response to the transmitted second unique identifier, each of the at least one one frame of the second video corresponding to a different one of a plurality of second unique identifiers, and outputting one or more of the at least one video frame of the second video for display to the user.

Advantageous Effects of Invention

According to the present technology, the user can confirm well the images captured by the plurality of cameras on the confirmation apparatus. It should be noted that the effects described in the present specification are merely illustrative and are not limitative, and may have additive effects.

DESCRIPTION OF EMBODIMENTS

Hereinafter, a mode (hereinafter referred to as embodiment) for carrying out the present technology will be described. The embodiment of the present technology will be described in the following order.

1. Embodiment
2. Modification Examples
3. Application

1. Embodiment (Configuration Example of Multi-Camera System)

Figure 1:
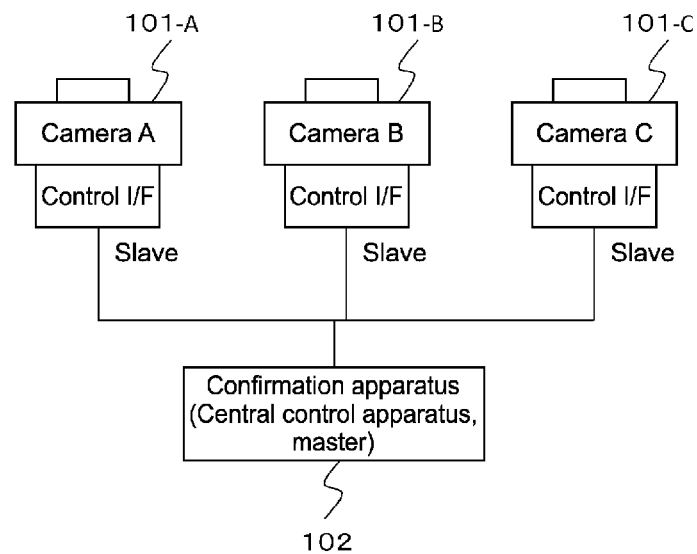
FIG. 1 is a block diagram showing a configuration example of a multi-camera system according to an embodiment of the present technology.

FIG. 1 shows a configuration example of a multi-camera system 10A according to an embodiment. The multi-camera system 10A includes a plurality of, here, three cameras (video cameras), i.e., a camera (camera A) 101-A, a camera (camera B) 101-B, and a camera (camera C) 101-C. In addition, the multi-camera system 10A includes a confirmation apparatus 102, which is a mobile terminal such as a smartphone and a tablet, a personal computer, or the like.

Figure 2:
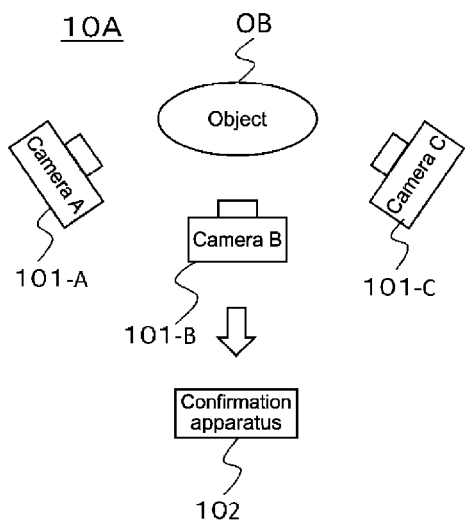
FIG. 2 is a diagram showing an installation status of the cameras.

The cameras 101-A, 101-B, and 101-C and the confirmation apparatus 102 are connected via a wired or wireless LAN. For example, the confirmation apparatus 102 functions as a master device, and the cameras 101-A, 101-B, and 101-C each functions as a slave device. FIG. 2 shows an installation status of the cameras 101-A, 101-B, and 101-C. The cameras 101-A, 101-B, and 101-C are arranged to capture the same object OB at different angles.

The confirmation apparatus 102 causes (triggers) each camera to start and stop capturing an image in response to a user's operation. In this case, the confirmation apparatus 102, i.e., the master device, issues a trigger signal (command) to start or stop capturing an image to each camera. Each camera receives the trigger signal via a control interface (control I/F), which is configured to perform communication, and operates in response to the instruction. Note that the control interface of each camera is built in the camera. In addition, the confirmation apparatus 102 includes a panel (display). After capturing an image, a user can check the image captured by each camera on the display.

The cameras 101-A, 101-B, and 101-C each includes an imager and a memory that writes image data of each frame obtained by capturing an image by the imager. In this case, the image data of each frame (frame rate of 60 Hz, for example) is intraframe-compressed, i.e., compressed in JPEG format in this embodiment, and the compressed data is written into the memory. In addition, the image data of each frame is loop-recorded in the memory for at least predetermined time or longer, i.e., three seconds or longer in this embodiment. It should be noted that the image data of each frame may not necessarily be loop-recorded. Alternatively, the image data of each frame may be encoded, e.g., Advanced Video Coded (AVC), and the encoded data may be written into the memory.

When each of the cameras 101-A, 101-B, and 101-C receives an end trigger signal from the confirmation apparatus 102, each of the cameras 101-A, 101-B, and 101-C assigns frame numbers to frames within a predetermined past time period, i.e., three seconds in this embodiment, starting from the frame corresponding to the end trigger signal. For example, the first frame number is "1", and the last frame number is "180". When each of the cameras 101-A, 101-B, and 101-C receives a transfer request including a frame number from the confirmation apparatus 102, each of the cameras 101-A, 101-B, and 101-C reads the image data of the frame having the specified frame number from the memory, and transfers the image data to the confirmation apparatus 102.

The confirmation apparatus 102 sends the end trigger signal to each camera in response to a user's operation to stop capturing an image. In addition, the confirmation apparatus 102 sends the transfer request including the frame number to a predetermined camera selected from the cameras 101-A, 101-B, and 101-C in response to the user's operation. Then, the confirmation apparatus 102 receives the image data of the frame having the specified frame number transferred from the predetermined camera, and displays an image of the image data on the panel (display).

(Configuration Example of Camera)

Figure 3:
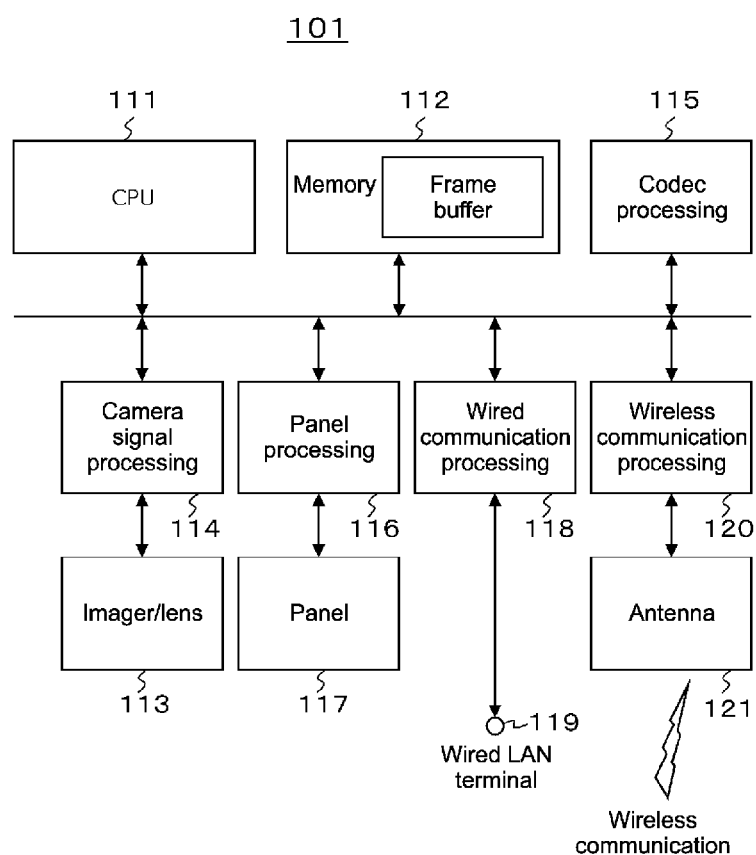
FIG. 3 is a block diagram showing a configuration example of the camera.

FIG. 3 shows a configuration example of the camera 101 (101-A, 101-B, and 101-C). The camera 101 includes a CPU 111, a memory 112, an imager/lens 113, a camera signal processing unit 114, and a codec processing unit 115. Further, the camera 101 includes a panel processing unit 116, a panel 117, a wired communication processing unit 118, a wired LAN terminal 119, a wireless communication processing unit 120, and an antenna 121.

The CPU 111 controls operation of components of the camera 101. The memory 112 stores control software and data, and constitutes a work area of the CPU 111 and the like. In addition, the memory 112 constitutes the frame buffer that loop-records the captured image data.

The imager/lens 113 includes an image capture lens and an imager, captures an image of an object, and obtains an image capture signal. The camera signal processing unit 114 processes the image capture signal obtained by the imager/lens 113, and generates image data (captured image data) corresponding to the object. The codec processing unit 115 JPEG-compresses the image data of each frame obtained by the camera signal processing unit 114. Thus, the image data of each frame JPEG-compressed is loop-recorded in the frame buffer of the memory 112.

The panel processing unit 116 drives a panel 117 on the basis of the image data obtained by the camera signal processing unit 114, and displays a captured image on the panel 117. The panel 117 includes an LCD, an organic EL panel, or the like. The panel 117 has a touch panel function. As necessary, user interfaces (UIs) are also displayed on the panel 117 for user's operation.

The wired communication processing unit 118 communicates via wire with an external device, i.e., the confirmation apparatus 102 in this embodiment, via a wired LAN terminal 119. The wireless communication processing unit 120 communicates wirelessly with the external device, i.e., the confirmation apparatus 102 in this embodiment, via an antenna 121. Note that either the wireless communication or the wired communication is selected.

(Configuration Example of Confirmation Apparatus)

Figure 4:
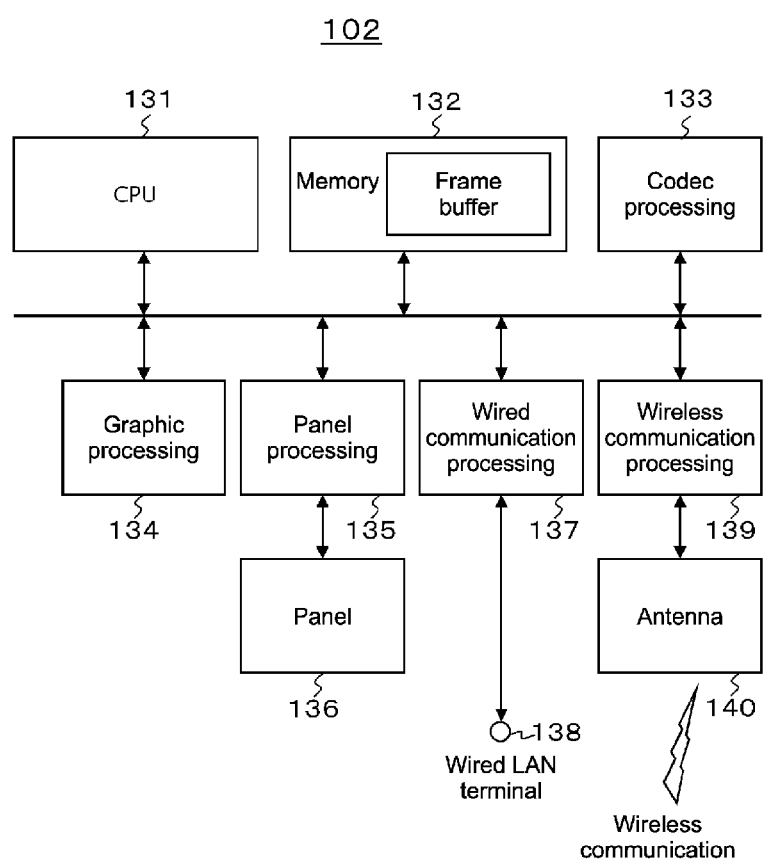
FIG. 4 is a block diagram showing a configuration example of the confirmation apparatus.

FIG. 4 shows a configuration example of the confirmation apparatus 102. The confirmation apparatus 102 includes a CPU 131, a memory 132, a codec processing unit 133, and a graphic processing unit 134.

In addition, the confirmation apparatus 102 includes a panel processing unit 135, a panel 136, a wired communication processing unit 137, a wired LAN terminal 138, a wireless communication processing unit, and an antenna 140.

The CPU 131 controls operation of components of the confirmation apparatus 102. The memory 132 stores control software and data, and constitutes a work area of the CPU 131 and the like. In addition, the memory 132 temporarily records the image data of each frame transferred from the camera 101 (see FIG. 3).

The codec processing unit 133 reads the image data of each frame temporarily recorded in the frame buffer of the memory 132, and decompresses the image data for displaying the image. The panel processing unit 135 drives the panel 136 on the basis of the image data decompressed by the codec processing unit 133, and displays the image on the panel 136. The panel 136 includes an LCD, an organic EL panel, or the like. The panel 136 has a touch panel function. As necessary, UIs are also displayed on the panel 136 for user's operation.

The wired communication processing unit 137 communicates via wire with an external device, i.e., the camera 101 in this embodiment, via a wired LAN terminal 138. The wireless communication processing unit 139 communicates wirelessly with the external device, i.e., the camera 101 in this embodiment, via an antenna 140. Note that either the wireless communication or the wired communication is selected.

(Example of Assigning Frame Numbers by End Trigger)

Figure 5:
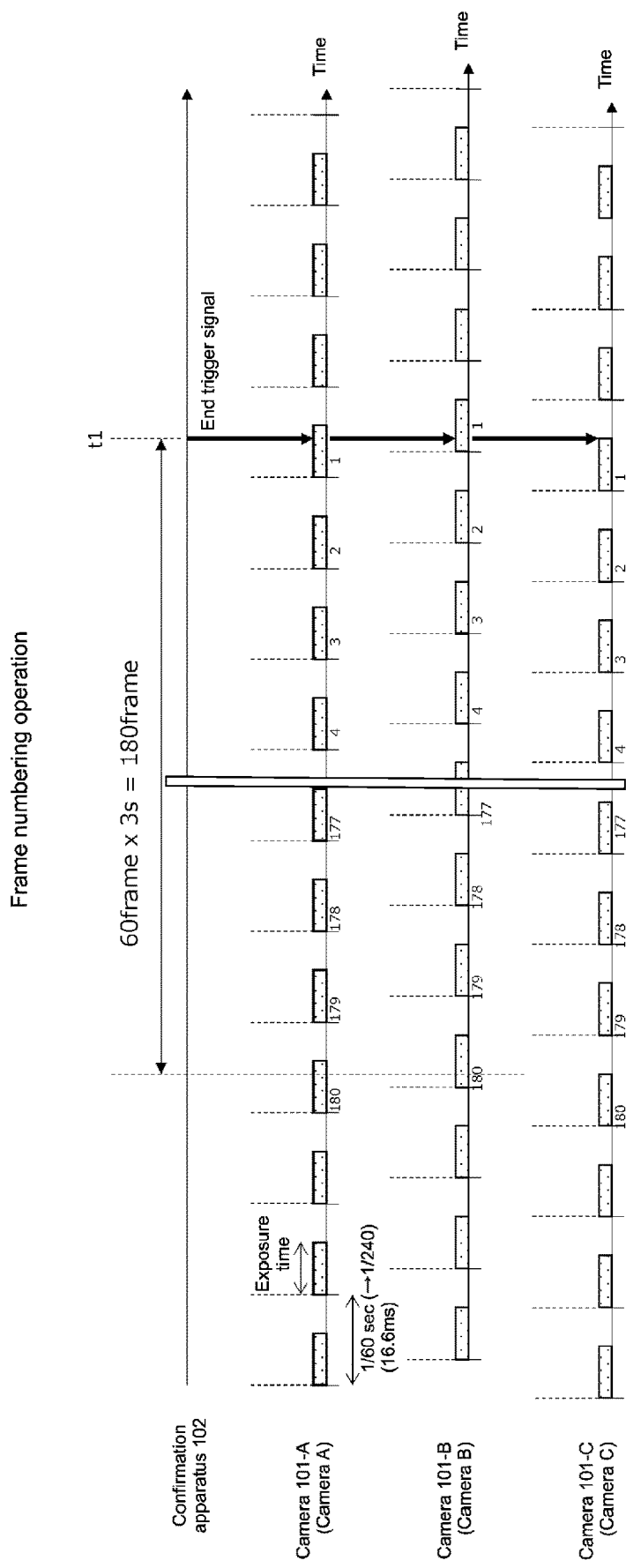
FIG. 5 is a diagram showing an example of timing charts when each camera assigns frame numbers to frames in the frame buffer.

FIG. 5 shows an example of timing charts when each camera assigns the frame numbers to the frames in the frame buffer where the end trigger signal is sent from the confirmation apparatus 102 to each camera. At the time t1, the confirmation apparatus 102 sends the end trigger signal to each camera. Each camera stops a recording operation on the frame at the time t1 (an image-capturing operation is not necessarily stopped, but may be stopped), and the frame number "1" is assigned to the frame. Then, each camera assigns frame numbers to the respective frames recorded in the frame buffer in the descending order starting from the frame having the frame number "1" backward in time series.

In the example shown in FIG. 5, frame numbers are assigned to the frames of a moving image for three seconds starting from the end trigger, and therefore each front frame has the frame number "180". In this manner, the frames having the same frame number of the respective cameras are considered to be at the same time point. The respective cameras may not necessarily have the same exposure phase, for example, using a generator lock (Genlock). In addition, timing differences are permissible when the end trigger signal reaches the respective cameras from the confirmation apparatus 102. However, if the respective cameras have the same exposure phase and the same trigger timing, an image taken by one camera can be smoothly switched to an image taken by the other camera when reproducing the image.

(Example of User Interfaces on Confirmation Apparatus)

Figure 6:
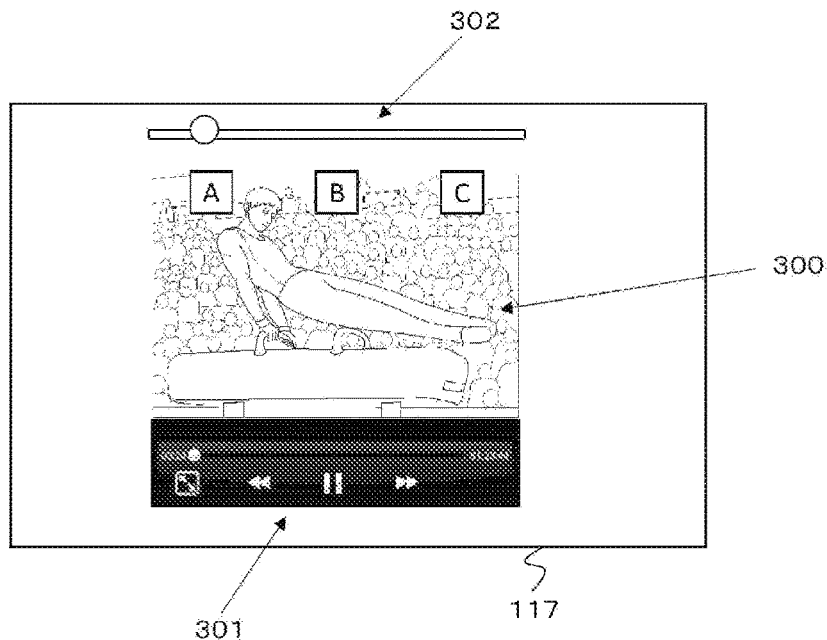
FIG. 6 is a diagram showing an example of a screen for reproducing an image (moving image content) captured by multiple cameras and displayed on a panel of the confirmation apparatus.

FIG. 6 shows an example of a screen for reproducing images (moving image content) captured by the multiple cameras and displayed on the panel 136 of the confirmation apparatus 102. In this example, the camera (camera A) 101-A is selected, and an image 300 captured by the camera (camera A) 101-A is displayed. An UI screen is superimposed on the captured image of the screen for the user's operation.

A user operates a play operation part 301, in which play icons are displayed. As a result, the image captured by the selected camera on the screen can be operated normally including reproduction, pause, fast forward, rewind, frame-by-frame advance, and the like. Here, a scroll bar is provided next to the play icons, which is scrolled with a finger to perform frame-by-frame advance forward and backward, fast forward, and rewind.

The user operates a camera switching operation part 302, in which camera switching icons are displayed. As a result, it is possible to switch a frame at one camera angle to a frame at another camera angle at desired reproduction time. In this example, when the button "B" is pressed, the image captured by the camera (camera A) 101-A is switched to the image captured by the camera (camera B) 101-B at the same time point, i.e., at the moment when the button is pressed. Similarly, when the button "C" is pressed, the image captured by the camera (camera A) 101-A is switched to the image captured by the camera (camera C) 101-C at the same time point, i.e., at the moment when the button is pressed.

Note that the cameras can be switched not only by pressing the buttons, but also by scrolling the scroll bar above the buttons from left to right or vice versa. In a case where a larger number of cameras are used, it is possible to reproduce images like time-slice representation. The cameras can be switched during the reproduction or during the pause.

(Communication Sequence Between Confirmation Apparatus and Each Camera)

Figure 7:
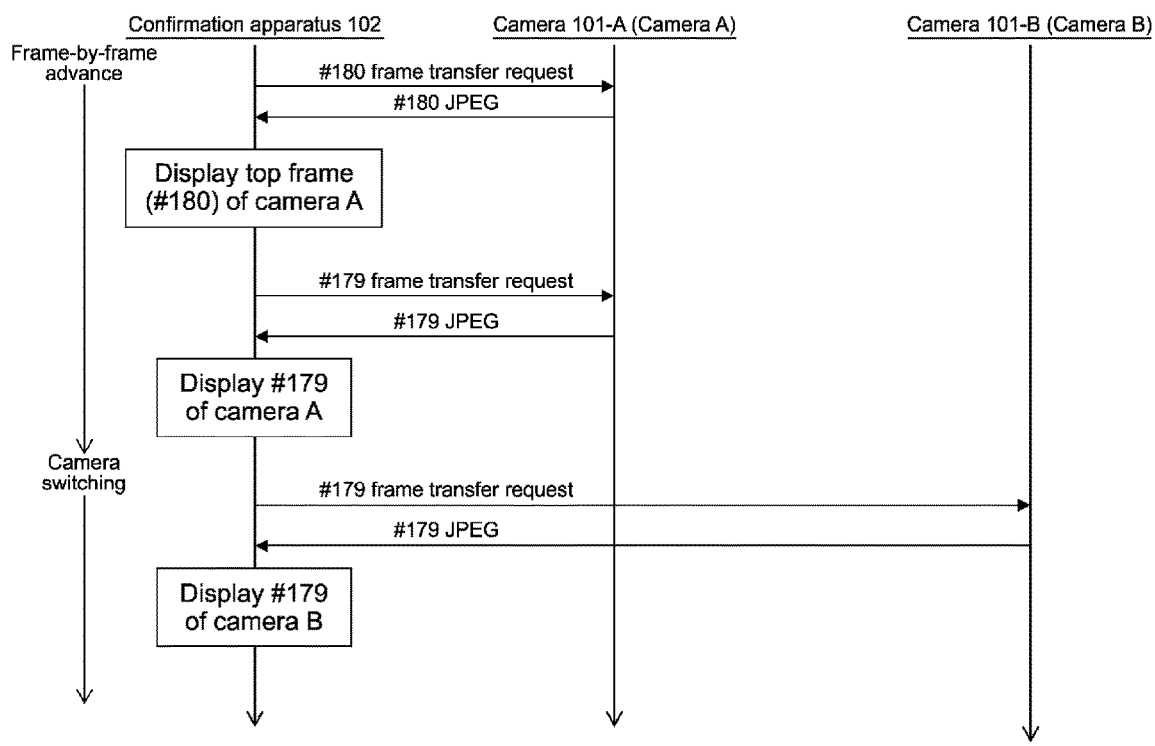
FIG. 7 is a diagram showing a communication sequence example between the confirmation apparatus and each camera at the time of the reproduction.

FIG. 7 is a diagram showing a communication sequence example between the confirmation apparatus 102 and each camera at the time of the reproduction. First, FIG. 7 shows a communication example that the images captured by the camera (camera A) 101-A are displayed by frame-by-frame advance.

As the frame number of the front frame is "180 (#180)", the confirmation apparatus 102 requests the camera (camera A) 101-A to transfer the image data of the #180 frame (in this case, compressed and coded in JPEG format). In response, the camera (camera A) 101-A reads the image data of the #180 frame in the frame buffer of the camera (camera A) 101-A, and transfers the image data to the confirmation apparatus 102. As a result, the image of the image data of the #180 frame is displayed on the panel 136 of the confirmation apparatus 102.

Next, the confirmation apparatus 102 similarly requests the camera (camera A) 101-A to transfer the image data of the #179 frame. In response, the camera (camera A) 101-A reads the image data of the #179 frame in the frame buffer of the camera (camera A) 101-A, and transfers the image data to the confirmation apparatus 102. As a result, the image of the image data of the #179 frame is displayed on the panel 136 of the confirmation apparatus 102.

Next, the confirmation apparatus 102 switches the camera (camera A) 101-A to the (camera B) 101-B. For example, this corresponds to the operation when the button "B" of the camera switching operation part 302 on the UI screen of FIG. 6 is pressed. In this case, the confirmation apparatus 102 requests the camera (camera B) 101-B to transfer the image data of the #179 frame. As a result, the image of the image data of the #179 frame is displayed on the panel 136 of the confirmation apparatus 102. The similar operation will be repeated thereafter.

(Example of Improvement in Display Latency)

In the above-described example, the confirmation apparatus 102 acquires image data of a predetermined frame from a predetermined camera that took the image every time the confirmation apparatus 102 displays the image of the predetermined frame taken by the predetermined camera. In this case, it is undesirably expected to prolong display latency depending on the status of a communication path, in particular where the confirmation apparatus 102 is connected to each camera via the wireless LAN.

In order to improve the display latency, it is conceivable that the memory 132 of the confirmation apparatus 102 (see FIG. 4) includes the frame buffer, and the content-to-be-reproduced of each camera is downloaded to the frame buffer in advance. In this embodiment, the JPEG files for three seconds of all the cameras are buffered in the confirmation apparatus 102 in advance. After the buffering, the confirmation apparatus 102 reproduces the images without communication, i.e., closed, and unaffected by the status of a communication path. As a result, the display latency is improved.

Figure 8:
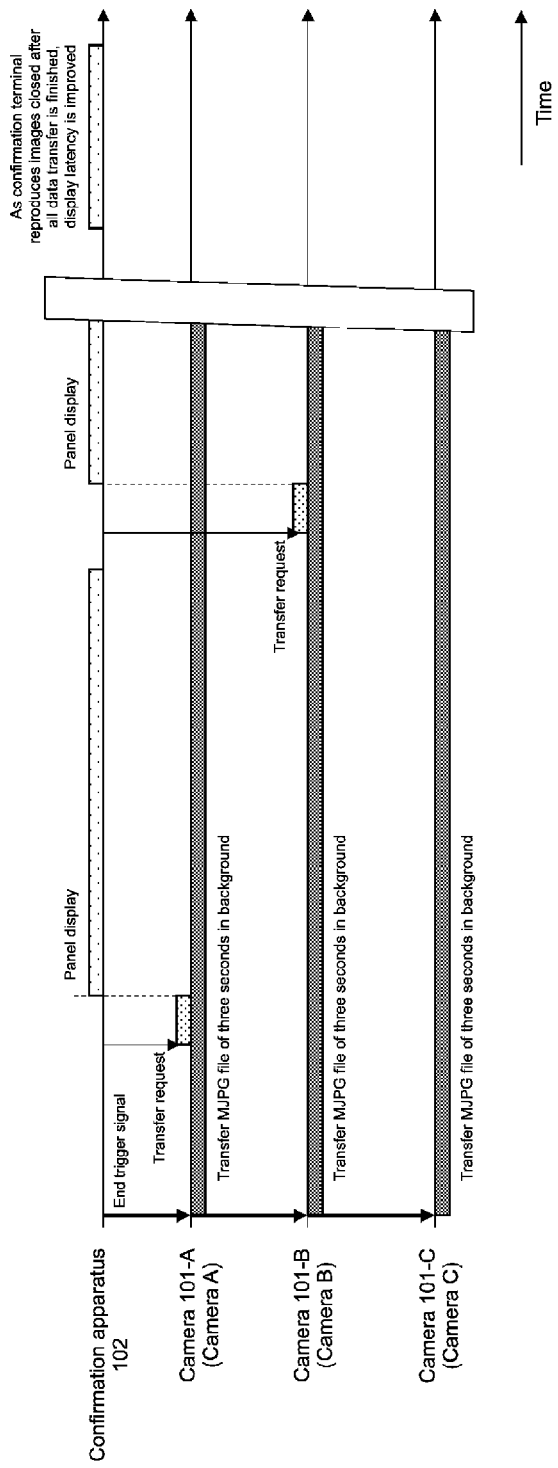
FIG. 8 is a diagram showing an example of an operation, in which content-to-be-reproduced is downloaded from each camera to the frame buffer of the confirmation apparatus in advance.

FIG. 8 is a timing chart showing an example of an operation, in which content-to-be-reproduced is downloaded from each camera to the frame buffer of the confirmation apparatus 102 in advance. Immediately after the confirmation apparatus 102 supplies the end trigger signal to each camera and each camera stops recording, the confirmation apparatus 102 starts acquiring the image data of the predetermined frames from the predetermined camera and displaying, i.e., reproducing, the image. Concurrently, each camera transfers JPEG files (=Motion JPRG/MPEG) for three seconds to the confirmation apparatus 102 in background.

After each camera finishes transferring the files, the confirmation apparatus 102 does not communicate with each camera but acquires the image data of the predetermined frames in the frame buffer of the confirmation apparatus 102, and thereby displays the image of the predetermined frames taken by the predetermined camera. In this manner, the display latency is improved unaffected by the status of a communication path.

Figure 9:
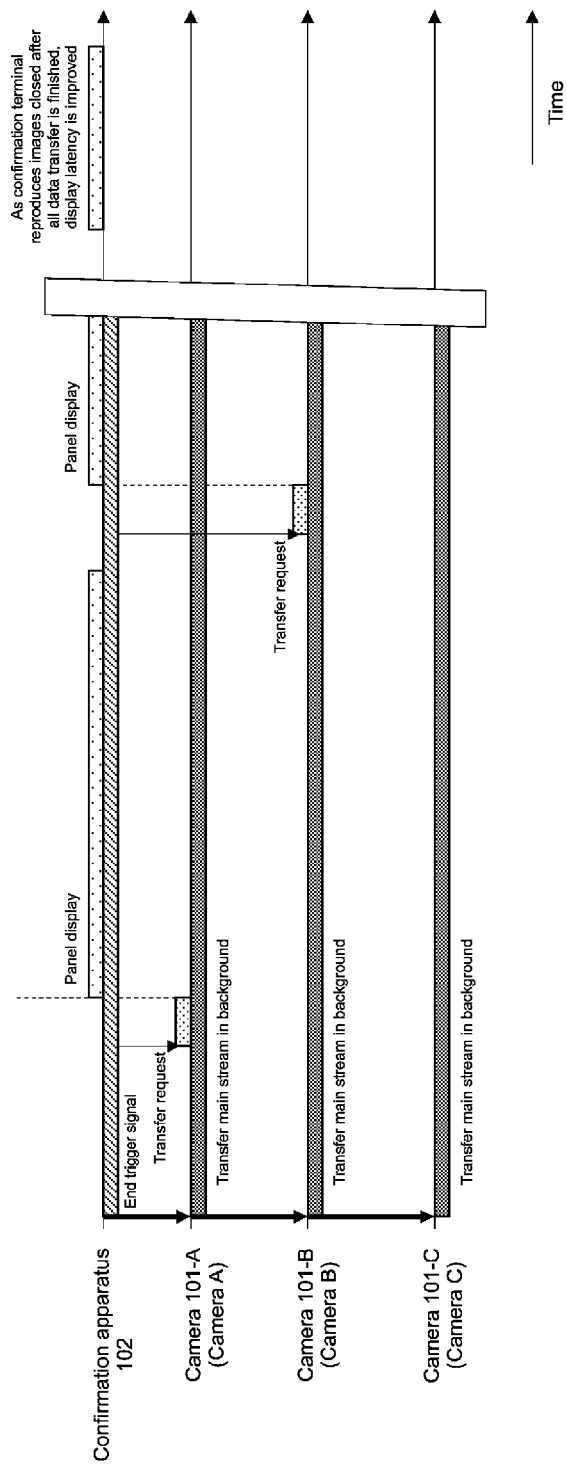
FIG. 9 is a diagram showing another example of an operation, in which content-to-be-reproduced is downloaded from each camera to the frame buffer of the confirmation apparatus in advance.

FIG. 9 is a timing chart showing another example of an operation, in which content-to-be-reproduced is downloaded from each camera to the frame buffer of the confirmation apparatus 102 in advance. In this example, the image data transferred from the camera to the confirmation apparatus 102 in background is not the data compressed in the JPEG format, but main stream data encoded by the AVC or the like. In this case, the confirmation apparatus 102 may further encode the data into the data in the JPEG format or the like for a frame unit after the transfer.

As described above, in the multi-camera system 10A shown in FIG. 1, the confirmation apparatus 102 sends the end trigger signal to each of the cameras 101-A, 101-B, and 101-C, each of the cameras 101-A, 101-B, and 101-C assigns the frame numbers to the frames within a predetermined past time period starting from the frame corresponding to the timing at which each camera receives the end trigger signal, the confirmation apparatus 102 sends the transfer request including the frame numbers to each of the cameras 101-A, 101-B, and 101-C, and the confirmation apparatus 102 displays the image of the image data sent from the predetermined camera. Thus, the user can confirm well the image captured by each camera on the confirmation apparatus 102. In this case, the same frame number is assigned to the frames at the same time point taken by the respective cameras. As a result, it is possible to easily switch a frame at one camera angle at a time point to a frame at another camera angle at the same time point.

2. Modification Examples

In the above-described embodiment, the image data of the images captured by the cameras 101-A, 101-B, and 101-C has a frame rate of 60 Hz. The present technology is also applicable to the case that the image data of the images captured by the cameras 101-A, 101-B, and 101-C has another frame rate, e.g., a high frame rate of 240 Hz as shown in FIG. 5.

In the above-described embodiment, the numbers of the cameras are three. The present technology is also applicable to the case that the number of the cameras is two, four, or more than four.

In the above-described embodiment, each camera includes the control interface. Alternatively, it is conceivable that the camera may not include the control interface, and an external control device may be provided for each camera.

Figure 10:
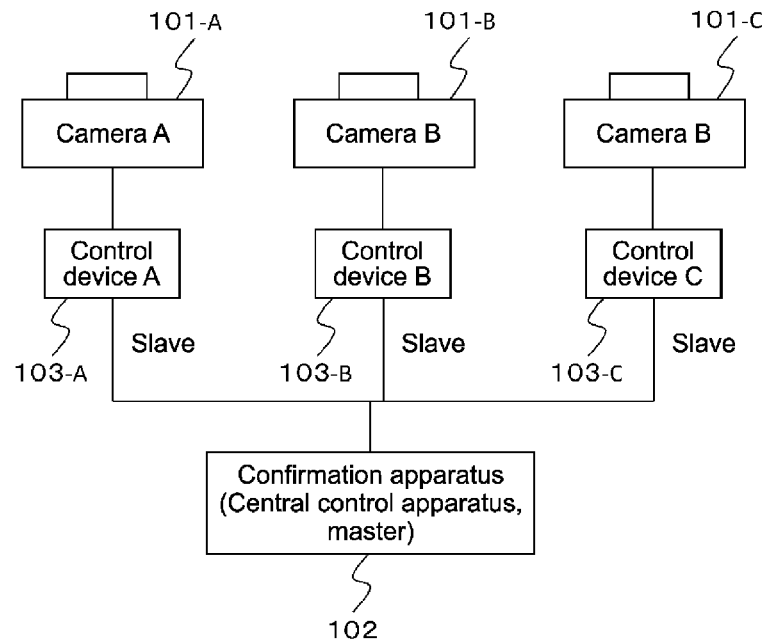
FIG. 10 is a block diagram showing another configuration example of the multi-camera system.

FIG. 10 shows a configuration example of the multi-camera system 10B of that case. The components of FIG. 10 corresponding to those of FIG. 1 are denoted by the same reference signs. Each of the cameras 101-A, 101-B, and 101-C includes no control interface (control I/F) unlike those of the multi-camera system 10A shown in FIG. 1. The cameras 101-A, 101-B, and 101-C include an external control device (control device A) 101-A, an external control device (control device B) 101-B, an external control device (control device C) 101-C having the similar functions as the control interface (control I/F), respectively.

Figure 11:
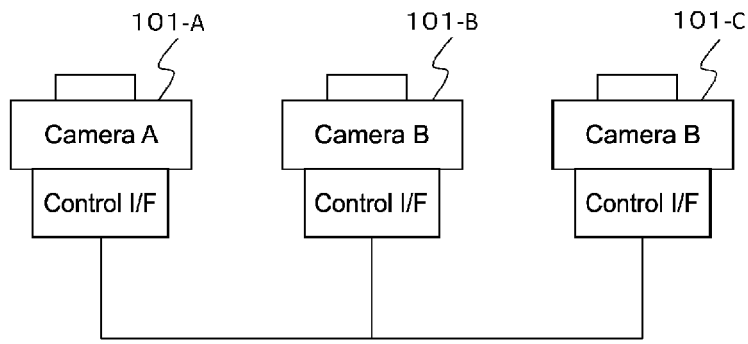
FIG. 11 is a block diagram showing another configuration example of the multi-camera system.

In the above-described embodiment, the confirmation apparatus 102 independent of the cameras 101-A, 101-B, and 101-C is provided. Alternatively, it is conceivable that no confirmation apparatus 102 may be provided, and any of the cameras 101-A, 101-B, and 101-C may also function as the confirmation apparatus. FIG. 11 shows a configuration example of a multi-camera system 10C of that case. The components of FIG. 11 corresponding to those of FIG. 1 are denoted by the same reference signs.

Figure 12:
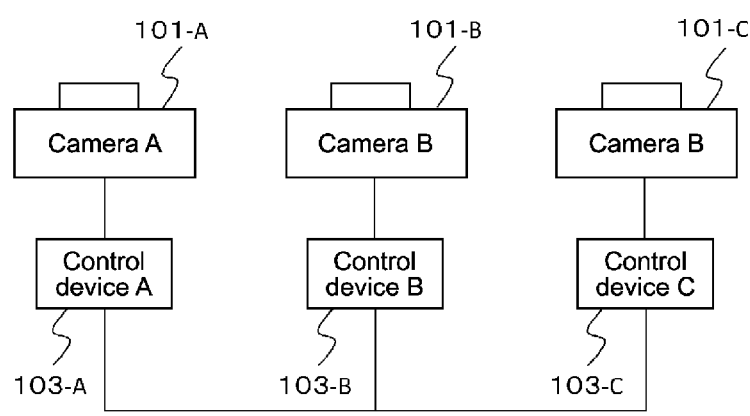
FIG. 12 is a block diagram showing another configuration example of the multi-camera system.

Note that the multi-camera system 10C shown in FIG. 11 corresponds to the multi-camera system 10A shown in FIG. 1. The same applies to the multi-camera system 10B shown in FIG. 10. FIG. 12 shows a configuration example of the multi-camera system 10D corresponding to the multi-camera system 10B shown in FIG. 10, detailed description of which is omitted.

3. Application

The technology according to an embodiment of the present disclosure can be applied to various products. For example, the multi-camera system, camera, processing method of the camera, confirmation apparatus, and/or processing method of the confirmation apparatus according to certain embodiments of the present disclosure may be applied to a surgery room system.

In one embodiment, application of the present technology to the medical field, such as a surgery room system, allows an operator (e.g., a surgeon) to mark events during a medical procedure (e.g., a surgery) for subsequent review. The marked events allow the operator or any other person to later switch between video recorded by multiple cameras during playback.

For example, the multi-camera system 10A when incorporated in a surgery room system may include a ceiling camera 5187, and surgery field camera 5189, and audiovisual controller 5107, as described below. The ceiling camera 5187 corresponds to the camera 101-A, the surgery field camera 5189 corresponds to the camera 101-B, and the confirmation apparatus 102 is incorporated in the audiovisual controller 5107, according to one embodiment. In other embodiments, the confirmation apparatus 102 is provided as a separate device (e.g., a mobile terminal such as a smartphone and a tablet, a personal computer, or the like).

In one embodiment, the confirmation apparatus 102 sends an end trigger signal to each camera (e.g., the ceiling camera 5187 and surgery field camera 5189) in response to a user's (e.g., operator or surgeon) operation to stop capturing an image. The confirmation apparatus 102 may include or be coupled to a switch (e.g., a pedal or button) that is actuated by the operator as the user's operation. As described above, when each of a plurality of cameras (e.g., the ceiling camera 5187 and surgery field camera 5189) receives the end trigger signal from the confirmation apparatus 102, each of the cameras assigns frame numbers to frames within a predetermined past time period, i.e., three seconds in this embodiment, starting from the frame corresponding to the end trigger signal. For example, the first frame number is "1", and the last frame number is "180". When each of the cameras receives a transfer request including a frame number from the confirmation apparatus 102, each of the cameras reads the image data of the frame having the specified frame number from the memory, and transfers the image data to the confirmation apparatus 102, as similar to as described above.

Figure 13:
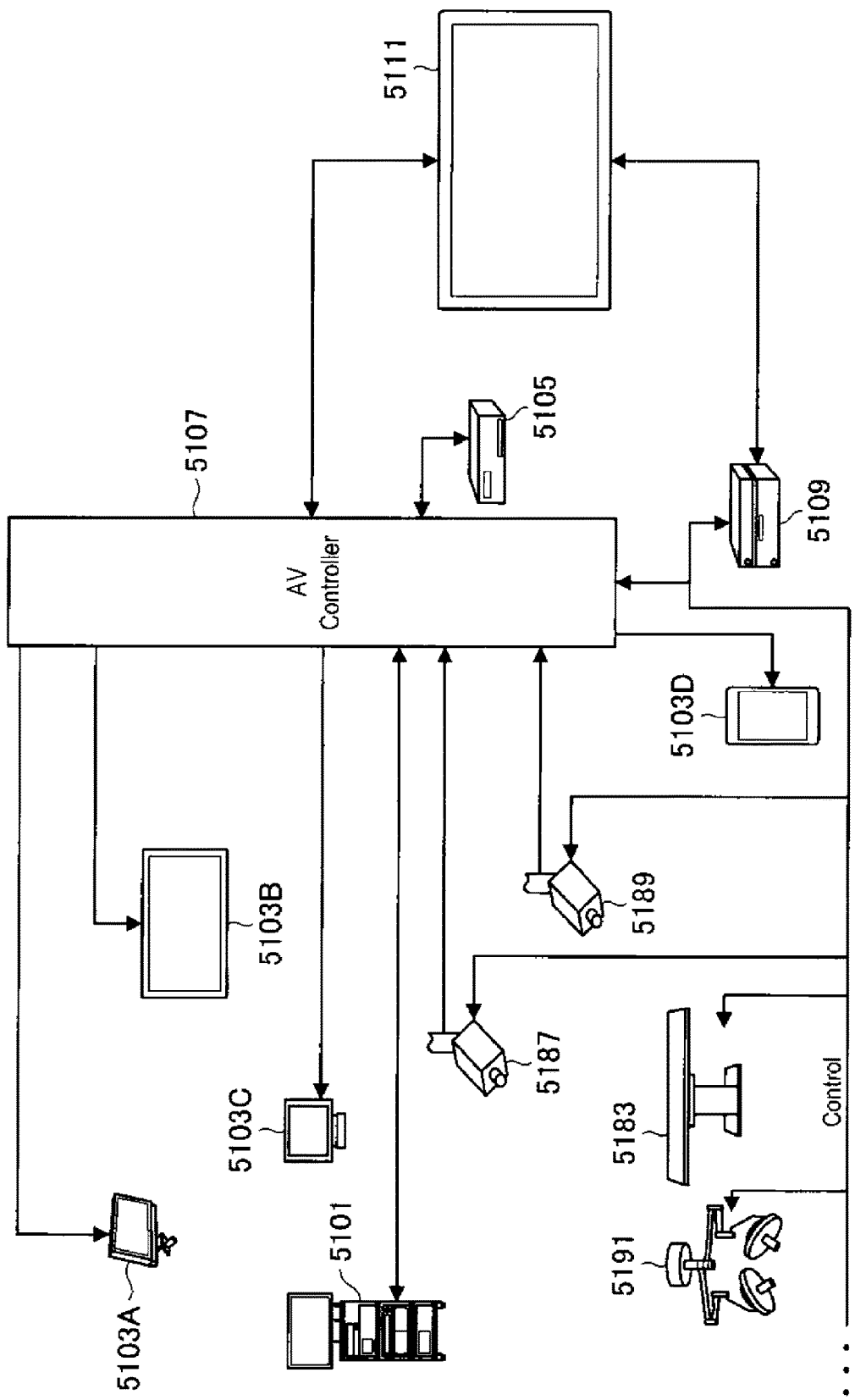
FIG. 13 is a view schematically depicting a general configuration of a surgery room system.

FIG. 13 is a view schematically depicting a general configuration of a surgery room system 5100 to which the technology according to an embodiment of the present disclosure can be applied. Referring to FIG. 13, the surgery room system 5100 is configured such that a group of apparatus installed in a surgery room are connected for cooperation with each other through an audiovisual (AV) controller 5107 and a surgery room controlling apparatus 5109.

In the surgery room, various apparatus may be installed. In FIG. 13, as an example, various apparatus group 5101 for endoscopic surgery, a ceiling camera 5187, a surgery field camera 5189, a plurality of display apparatus 5103A to 5103D, a recorder 5105, a patient bed 5183 and an illumination 5191 are depicted. The ceiling camera 5187 is provided on the ceiling of a surgery room and images the hands of a surgeon. The surgery field camera 5189 is provided on the ceiling of the surgery room and images a state of the entire surgery room.

Among the apparatus mentioned, the apparatus group 5101 belongs to an endoscopic surgery system 5113 hereinafter described and include an endoscope, a display apparatus which displays an image picked up by the endoscope and so forth. Various apparatus belonging to the endoscopic surgery system 5113 are referred to also as medical equipment. Meanwhile, the display apparatus 5103A to 5103D, the recorder 5105, the patient bed 5183 and the illumination 5191 are apparatus which are equipped, for example, in the surgery room separately from the endoscopic surgery system 5113. The apparatus which do not belong to the endoscopic surgery system 5113 are referred to also as non-medical equipment. The audiovisual controller 5107 and/or the surgery room controlling apparatus 5109 cooperatively control operation of the medical equipment and the non-medical equipment with each other.

The audiovisual controller 5107 integrally controls processes of the medical equipment and the non-medical equipment relating to image display. Specifically, each of the apparatus group 5101, the ceiling camera 5187 and the surgery field camera 5189 from among the apparatus provided in the surgery room system 5100 may be an apparatus having a function of sending information to be displayed during surgery (such information is hereinafter referred to as display information, and the apparatus mentioned is hereinafter referred to as apparatus of a sending source). Meanwhile, each of the display apparatus 5103A to 5103D may be an apparatus to which display information is outputted (the apparatus is hereinafter referred to also as apparatus of an output destination). Further, the recorder 5105 may be an apparatus which serves as both of an apparatus of a sending source and an apparatus of an output destination. The audiovisual controller 5107 has a function of controlling operation of an apparatus of a sending source and an apparatus of an output destination to acquire display information from the apparatus of a sending source and transmit the display information to the apparatus of an output destination so as to be displayed or recorded. It is to be noted that the display information includes various images picked up during surgery, various kinds of information relating to the surgery (for example, physical information of a patient, inspection results in the past or information regarding a surgical procedure) and so forth.

Specifically, to the audiovisual controller 5107, information relating to an image of a surgical region in a body lumen of a patient imaged by the endoscope may be transmitted as the display information from the apparatus group 5101. Further, from the ceiling camera 5187, information relating to an image of the hands of the surgeon picked up by the ceiling camera 5187 may be transmitted as display information. Further, from the surgery field camera 5189, information relating to an image picked up by the surgery field camera 5189 and illustrating a state of the entire surgery room may be transmitted as display information. It is to be noted that, if a different apparatus having an image pickup function exists in the surgery room system 5100, then the audiovisual controller 5107 may acquire information relating to an image picked up by the different apparatus as display information also from the different apparatus.

Alternatively, for example, in the recorder 5105, information relating to such images as mentioned above picked up in the past is recorded by the audiovisual controller 5107. The audiovisual controller 5107 can acquire, as display information, information relating to the images picked up in the past from the recorder 5105. It is to be noted that also various pieces of information relating to surgery may be recorded in advance in the recorder 5105.

The audiovisual controller 5107 controls at least one of the display apparatus 5103A to 5103D, which are apparatus of an output destination, to display acquired display information (namely, images picked up during surgery or various pieces of information relating to the surgery). In the example depicted, the display apparatus 5103A is a display apparatus installed so as to be suspended from the ceiling of the surgery room; the display apparatus 5103B is a display apparatus installed on a wall face of the surgery room; the display apparatus 5103C is a display apparatus installed on a desk in the surgery room; and the display apparatus 5103D is a mobile apparatus (for example, a tablet personal computer (PC)) having a display function.

Further, though not depicted in FIG. 13, the surgery room system 5100 may include an apparatus outside the surgery room. The apparatus outside the surgery room may be, for example, a server connected to a network constructed inside and outside the hospital, a PC used by medical staff, a projector installed in a meeting room of the hospital or the like. Where such an external apparatus is located outside the hospital, also it is possible for the audiovisual controller 5107 to cause display information to be displayed on a display apparatus of a different hospital through a teleconferencing system or the like to perform telemedicine.

The surgery room controlling apparatus 5109 integrally controls processes other than processes relating to image display on the non-medical equipment. For example, the surgery room controlling apparatus 5109 controls driving of the patient bed 5183, the ceiling camera 5187, the surgery field camera 5189 and the illumination 5191.

In the surgery room system 5100, a centralized operation panel 5111 is provided such that it is possible to issue an instruction regarding image display to the audiovisual controller 5107 or issue an instruction regarding operation of the non-medical equipment to the surgery room controlling apparatus 5109 through the centralized operation panel 5111. The centralized operation panel 5111 is configured by providing a touch panel on a display face of a display apparatus.

Figure 14:
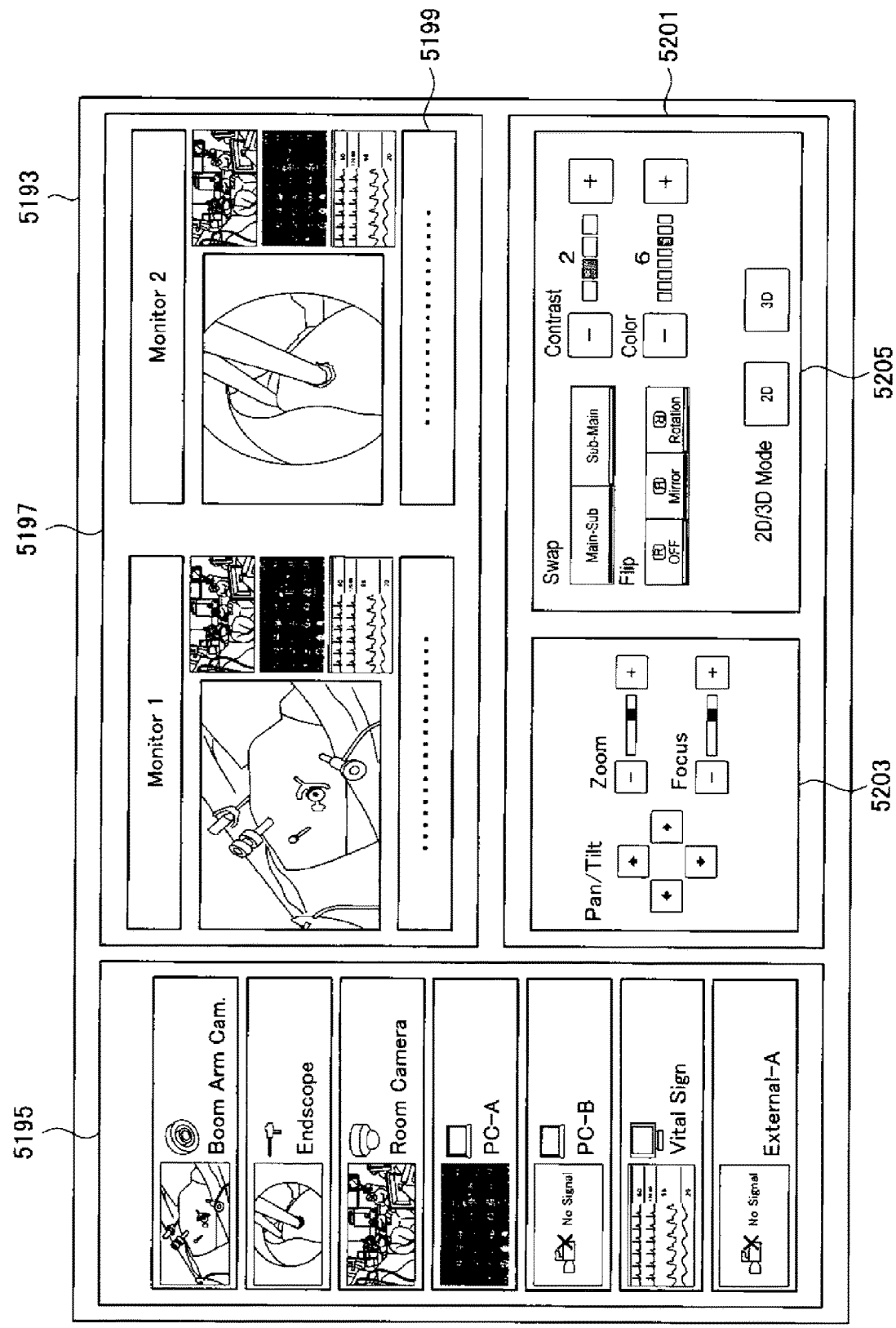
FIG. 14 is a view depicting an example of display of an operation screen image of a centralized operation panel.

FIG. 14 is a view depicting an example of display of an operation screen image on the centralized operation panel 5111. In FIG. 14, as an example, an operation screen image is depicted which corresponds to a case in which two display apparatus are provided as apparatus of an output destination in the surgery room system 5100. Referring to FIG. 14, the operation screen image 5193 includes a sending source selection region 5195, a preview region 5197 and a control region 5201.

In the sending source selection region 5195, the sending source apparatus provided in the surgery room system 5100 and thumbnail screen images representative of display information the sending source apparatus have are displayed in an associated manner with each other. A user can select display information to be displayed on the display apparatus from any of the sending source apparatus displayed in the sending source selection region 5195.

In the preview region 5197, a preview of screen images displayed on two display apparatus (Monitor 1 and Monitor 2) which are apparatus of an output destination is displayed. In the example depicted, four images are displayed by picture in picture (PinP) display in regard to one display apparatus. The four images correspond to display information sent from the sending source apparatus selected in the sending source selection region 5195. One of the four images is displayed in a comparatively large size as a main image while the remaining three images are displayed in a comparatively small size as sub images. The user can exchange between the main image and the sub images by suitably selecting one of the images from among the four images displayed in the region. Further, a status displaying region 5199 is provided below the region in which the four images are displayed, and a status relating to surgery (for example, elapsed time of the surgery, physical information of the patient and so forth) may be displayed suitably in the status displaying region 5199.

A sending source operation region 5203 and an output destination operation region 5205 are provided in the control region 5201. In the sending source operation region 5203, a graphical user interface (GUI) part for performing an operation for an apparatus of a sending source is displayed. In the output destination operation region 5205, a GUI part for performing an operation for an apparatus of an output destination is displayed. In the example depicted, GUI parts for performing various operations for a camera (panning, tilting and zooming) in an apparatus of a sending source having an image pickup function are provided in the sending source operation region 5203. The user can control operation of the camera of an apparatus of a sending source by suitably selecting any of the GUI parts. It is to be noted that, though not depicted, where the apparatus of a sending source selected in the sending source selection region 5195 is a recorder (namely, where an image recorded in the recorder in the past is displayed in the preview region 5197), GUI parts for performing such operations as reproduction of the image, stopping of reproduction, rewinding, fast-feeding and so forth may be provided in the sending source operation region 5203.

Further, in the output destination operation region 5205, GUI parts for performing various operations for display on a display apparatus which is an apparatus of an output destination (swap, flip, color adjustment, contrast adjustment and switching between two dimensional (2D) display and three dimensional (3D) display) are provided. The user can operate the display of the display apparatus by suitably selecting any of the GUI parts.

It is to be noted that the operation screen image to be displayed on the centralized operation panel 5111 is not limited to the depicted example, and the user may be able to perform operation inputting to each apparatus which can be controlled by the audiovisual controller 5107 and the surgery room controlling apparatus 5109 provided in the surgery room system 5100 through the centralized operation panel 5111.

Figure 15:
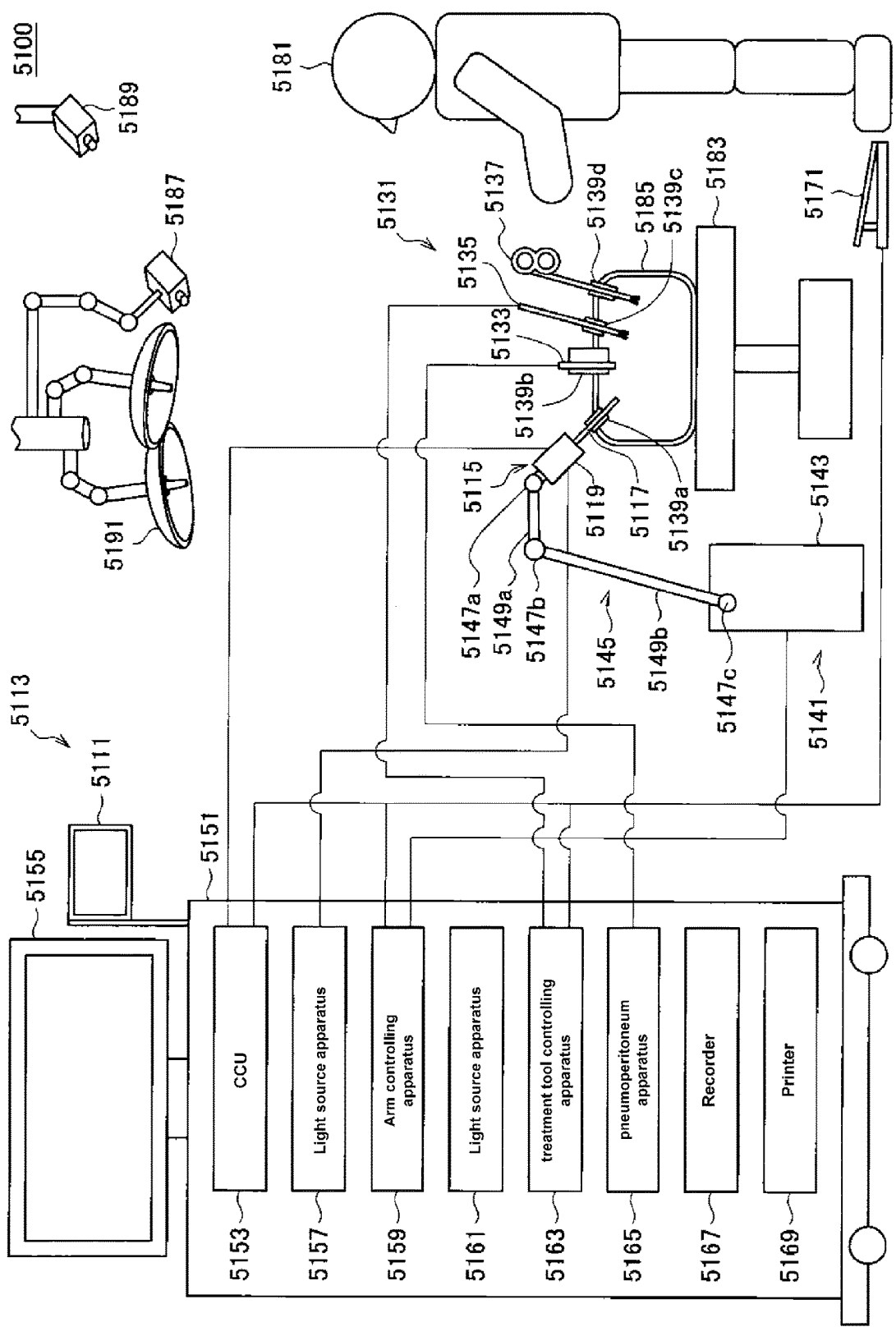
FIG. 15 is a view illustrating an example of a state of surgery to which the surgery room system is applied.

FIG. 15 is a view illustrating an example of a state of surgery to which the surgery room system described above is applied. The ceiling camera 5187 and the surgery field camera 5189 are provided on the ceiling of the surgery room such that it can image the hands of a surgeon (medical doctor) 5181 who performs treatment for an affected area of a patient 5185 on the patient bed 5183 and the entire surgery room. The ceiling camera 5187 and the surgery field camera 5189 may include a magnification adjustment function, a focal distance adjustment function, an imaging direction adjustment function and so forth. The illumination 5191 is provided on the ceiling of the surgery room and irradiates light at least upon the hands of the surgeon 5181. The illumination 5191 may be configured such that the irradiation light amount, the wavelength (color) of the irradiation light, the irradiation direction of the light and so forth can be adjusted suitably.

The endoscopic surgery system 5113, the patient bed 5183, the ceiling camera 5187, the surgery field camera 5189 and the illumination 5191 are connected for cooperation with each other through the audiovisual controller 5107 and the surgery room controlling apparatus 5109 (not depicted in FIG. 15) as depicted in FIG. 13. The centralized operation panel 5111 is provided in the surgery room, and the user can suitably operate the apparatus existing in the surgery room through the centralized operation panel 5111 as described hereinabove.

In the following, a configuration of the endoscopic surgery system 5113 is described in detail. As depicted, the endoscopic surgery system 5113 includes an endoscope 5115, other surgical tools 5131, a supporting arm apparatus 5141 which supports the endoscope 5115 thereon, and a cart 5151 on which various apparatus for endoscopic surgery are mounted.

In endoscopic surgery, in place of incision of the abdominal wall to perform laparotomy, a plurality of tubular aperture devices called trocars 5139a to 5139d are used to puncture the abdominal wall. Then, a lens barrel 5117 of the endoscope 5115 and the other surgical tools 5131 are inserted into body lumens of the patient 5185 through the trocars 5139a to 5139d. In the example depicted, as the other surgical tools 5131, a pneumoperitoneum tube 5133, an energy treatment tool 5135 and forceps 5137 are inserted into body lumens of the patient 5185. Further, the energy treatment tool 5135 is a treatment tool for performing incision and peeling of a tissue, sealing of a blood vessel or the like by high frequency current or ultrasonic vibration. However, the surgical tools 5131 depicted are mere examples at all, and as the surgical tools 5131, various surgical tools which are generally used in endoscopic surgery such as, for example, a pair of tweezers or a retractor may be used.

An image of a surgical region in a body lumen of the patient 5185 picked up by the endoscope 5115 is displayed on a display apparatus 5155. The surgeon 5181 would use the energy treatment tool 5135 or the forceps 5137 while watching the image of the surgical region displayed on the display apparatus 5155 on the real time basis to perform such treatment as, for example, resection of an affected area. It is to be noted that, though not depicted, the pneumoperitoneum tube 5133, the energy treatment tool 5135, and the forceps 5137 are supported by the surgeon 5181, an assistant or the like during surgery.

(Supporting Arm Apparatus)

The supporting arm apparatus 5141 includes an arm unit 5145 extending from a base unit 5143. In the example depicted, the arm unit 5145 includes joint portions 5147a, 5147b and 5147c and links 5149a and 5149b and is driven under the control of an arm controlling apparatus 5159. The endoscope 5115 is supported by the arm unit 5145 such that the position and the posture of the endoscope 5115 are controlled. Consequently, stable fixation in position of the endoscope 5115 can be implemented.

(Endoscope)

The endoscope 5115 includes the lens barrel 5117 which has a region of a predetermined length from a distal end thereof to be inserted into a body lumen of the patient 5185, and a camera head 5119 connected to a proximal end of the lens barrel 5117. In the example depicted, the endoscope 5115 is depicted which is configured as a hard mirror having the lens barrel 5117 of the hard type. However, the endoscope 5115 may otherwise be configured as a soft mirror having the lens barrel 5117 of the soft type.

The lens barrel 5117 has, at a distal end thereof, an opening in which an objective lens is fitted. A light source apparatus 5157 is connected to the endoscope 5115 such that light generated by the light source apparatus 5157 is introduced to a distal end of the lens barrel 5117 by a light guide extending in the inside of the lens barrel 5117 and is irradiated toward an observation target in a body lumen of the patient 5185 through the objective lens. It is to be noted that the endoscope 5115 may be a direct view mirror or may be a perspective view mirror or a side view mirror.

An optical system and an image pickup element are provided in the inside of the camera head 5119 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5153. It is to be noted that the camera head 5119 has a function incorporated therein for suitably driving the optical system of the camera head 5119 to adjust the magnification and the focal distance.

It is to be noted that, in order to establish compatibility with, for example, a stereoscopic vision (3D display), a plurality of image pickup elements may be provided on the camera head 5119. In this case, a plurality of relay optical systems are provided in the inside of the lens barrel 5117 in order to guide observation light to the plurality of respective image pickup elements.

(Various Apparatus Incorporated in Cart)

The CCU 5153 includes a central processing unit (CPU), a graphics processing unit (GPU) or the like and integrally controls operation of the endoscope 5115 and the display apparatus 5155. Specifically, the CCU 5153 performs, for an image signal received from the camera head 5119, various image processes for displaying an image based on the image signal such as, for example, a development process (demosaic process). The CCU 5153 provides the image signal for which the image processes have been performed to the display apparatus 5155. Further, the audiovisual controller 5107 depicted in FIG. 13 is connected to the CCU 5153. The CCU 5153 provides the image signal for which the image processes have been performed also to the audiovisual controller 5107. Further, the CCU 5153 transmits a control signal to the camera head 5119 to control driving of the camera head 5119. The control signal may include information relating to an image pickup condition such as a magnification or a focal distance. The information relating to an image pickup condition may be inputted through the inputting apparatus 5161 or may be inputted through the centralized operation panel 5111 described hereinabove.

The display apparatus 5155 displays an image based on an image signal for which the image processes have been performed by the CCU 5153 under the control of the CCU 5153. If the endoscope 5115 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5155. Where the apparatus is ready for imaging of a high resolution such as 4K or 8K, if the display apparatus used as the display apparatus 5155 has a size of equal to or not less than 55 inches, then a more immersive experience can be obtained. Further, a plurality of display apparatus 5155 having different resolutions and/or different sizes may be provided in accordance with purposes.

The light source apparatus 5157 includes a light source such as, for example, a light emitting diode (LED) and supplies irradiation light for imaging of a surgical region to the endoscope 5115.

The arm controlling apparatus 5159 includes a processor such as, for example, a CPU and operates in accordance with a predetermined program to control driving of the arm unit 5145 of the supporting arm apparatus 5141 in accordance with a predetermined controlling method.

An inputting apparatus 5161 is an input interface for the endoscopic surgery system 5113. A user can perform inputting of various kinds of information or instruction inputting to the endoscopic surgery system 5113 through the inputting apparatus 5161. For example, the user would input various kinds of information relating to surgery such as physical information of a patient, information regarding a surgical procedure of the surgery and so forth through the inputting apparatus 5161. Further, the user would input, for example, an instruction to drive the arm unit 5145, an instruction to change an image pickup condition (type of irradiation light, magnification, focal distance or the like) by the endoscope 5115, an instruction to drive the energy treatment tool 5135 or a like through the inputting apparatus 5161.

The type of the inputting apparatus 5161 is not limited and may be that of any one of various known inputting apparatus. As the inputting apparatus 5161, for example, a mouse, a keyboard, a touch panel, a switch, a foot switch 5171 and/or a lever or the like may be applied. Where a touch panel is used as the inputting apparatus 5161, it may be provided on the display face of the display apparatus 5155.

The inputting apparatus 5161 is otherwise a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5161 includes a camera which can detect a motion of a user, and various kinds of inputting are performed in response to a gesture or a line of sight of a user detected from a video picked up by the camera. Further, the inputting apparatus 5161 includes a microphone which can collect the voice of a user, and various kinds of inputting are performed by voice through the microphone. By configuring the inputting apparatus 5161 such that various kinds of information can be inputted in a contactless fashion in this manner, especially a user who belongs to a clean area (for example, the surgeon 5181) can operate an apparatus belonging to an unclean area in a contactless fashion. Further, since the user can operate an apparatus without releasing a possessed surgical tool from its hand, the convenience to the user is improved.

A treatment tool controlling apparatus 5163 controls driving of the energy treatment tool 5135 for cautery or incision of a tissue, sealing of a blood vessel or the like. A pneumoperitoneum apparatus 5165 feeds gas into a body lumen of the patient 5185 through the pneumoperitoneum tube 5133 to inflate the body lumen in order to secure the field of view of the endoscope 5115 and secure the working space for the surgeon. A recorder 5167 is an apparatus capable of recording various kinds of information relating to surgery. A printer 5169 is an apparatus capable of printing various kinds of information relating to surgery in various forms such as a text, an image or a graph.

In the following, especially a characteristic configuration of the endoscopic surgery system 5113 is described in more detail.

(Supporting Arm Apparatus)

The supporting arm apparatus 5141 includes the base unit 5143 serving as a base, and the arm unit 5145 extending from the base unit 5143. In the example depicted, the arm unit 5145 includes the plurality of joint portions 5147*a*, 5147*b* and 5147*c* and the plurality of links 5149*a* and 5149*b* connected to each other by the joint portion 5147*b*. In FIG. 15, for simplified illustration, the configuration of the arm unit 5145 is depicted in a simplified form. Actually, the shape, number and arrangement of the joint portions 5147a to 5147c and the links 5149a and 5149b and the direction and so forth of axes of rotation of the joint portions 5147a to 5147c can be set suitably such that the arm unit 5145 has a desired degree of freedom. For example, the arm unit 5145 may preferably be included such that it has a degree of freedom equal to or not less than 6 degrees of freedom. This makes it possible to move the endoscope 5115 freely within the movable range of the arm unit 5145. Consequently, it becomes possible to insert the lens barrel 5117 of the endoscope 5115 from a desired direction into a body lumen of the patient 5185.

An actuator is provided in the joint portions 5147a to 5147c, and the joint portions 5147a to 5147c include such that they are rotatable around predetermined axes of rotation thereof by driving of the actuator. The driving of the actuator is controlled by the arm controlling apparatus 5159 to control the rotational angle of each of the joint portions 5147a to 5147c thereby to control driving of the arm unit 5145. Consequently, control of the position and the posture of the endoscope 5115 can be implemented. Thereupon, the arm controlling apparatus 5159 can control driving of the arm unit 5145 by various known controlling methods such as force control or position control.

For example, if the surgeon 5181 suitably performs operation inputting through the inputting apparatus 5161 (including the foot switch 5171), then driving of the arm unit 5145 may be controlled suitably by the arm controlling apparatus 5159 in response to the operation input to control the position and the posture of the endoscope 5115. After the endoscope 5115 at the distal end of the arm unit 5145 is moved from an arbitrary position to a different arbitrary position by the control just described, the endoscope 5115 can be supported fixedly at the position after the movement. It is to be noted that the arm unit 5145 may be operated in a master-slave fashion. In this case, the arm unit 5145 may be remotely controlled by the user through the inputting apparatus 5161 which is placed at a place remote from the surgery room.

Further, where force control is applied, the arm controlling apparatus 5159 may perform power-assisted control to drive the actuators of the joint portions 5147a to 5147c such that the arm unit 5145 may receive external force by the user and move smoothly following the external force. This makes it possible to move the arm unit 5145 with comparatively weak force when the user directly touches with and moves the arm unit 5145. Accordingly, it becomes possible for the user to move the endoscope 5115 more intuitively by a simpler and easier operation, and the convenience to the user can be improved.

Here, generally in endoscopic surgery, the endoscope 5115 is supported by a medical doctor called scopist. In contrast, where the supporting arm apparatus 5141 is used, the position of the endoscope 5115 can be fixed with a higher degree of certainty without hands, and therefore, an image of a surgical region can be obtained stably and surgery can be performed smoothly.

It is to be noted that the arm controlling apparatus 5159 may not necessarily be provided on the cart 5151. Further, the arm controlling apparatus 5159 may not necessarily be a single apparatus. For example, the arm controlling apparatus 5159 may be provided in each of the joint portions 5147a to 5147c of the arm unit 5145 of the supporting arm apparatus 5141 such that the plurality of arm controlling apparatus 5159 cooperate with each other to implement driving control of the arm unit 5145.

(Light Source Apparatus)

The light source apparatus 5157 supplies irradiation light upon imaging of a surgical region to the endoscope 5115. The light source apparatus 5157 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5157. Further, in this case, if laser beams from the RGB laser light sources are irradiated time-divisionally on an observation target and driving of the image pickup elements of the camera head 5119 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5157 may be controlled such that the intensity of light to be outputted is changed for each predetermined time. By controlling driving of the image pickup element of the camera head 5119 in synchronism with the timing of the change of the intensity of light to acquire images time-divisionally and synthesizing the images, an image of a high dynamic range free from underexposed blocked up shadows and overexposed highlights can be created.

Further, the light source apparatus 5157 may be configured to supply light of a predetermined wavelength band ready for special light observation. In special light observation, for example, by utilizing the wavelength dependency of absorption of light of a body tissue to irradiate light of a narrower band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may also be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5157 can be configured to supply such narrow-band light and/or excitation light suitable for special light observation as described above.

(Camera Head and CCU)

Figure 16:
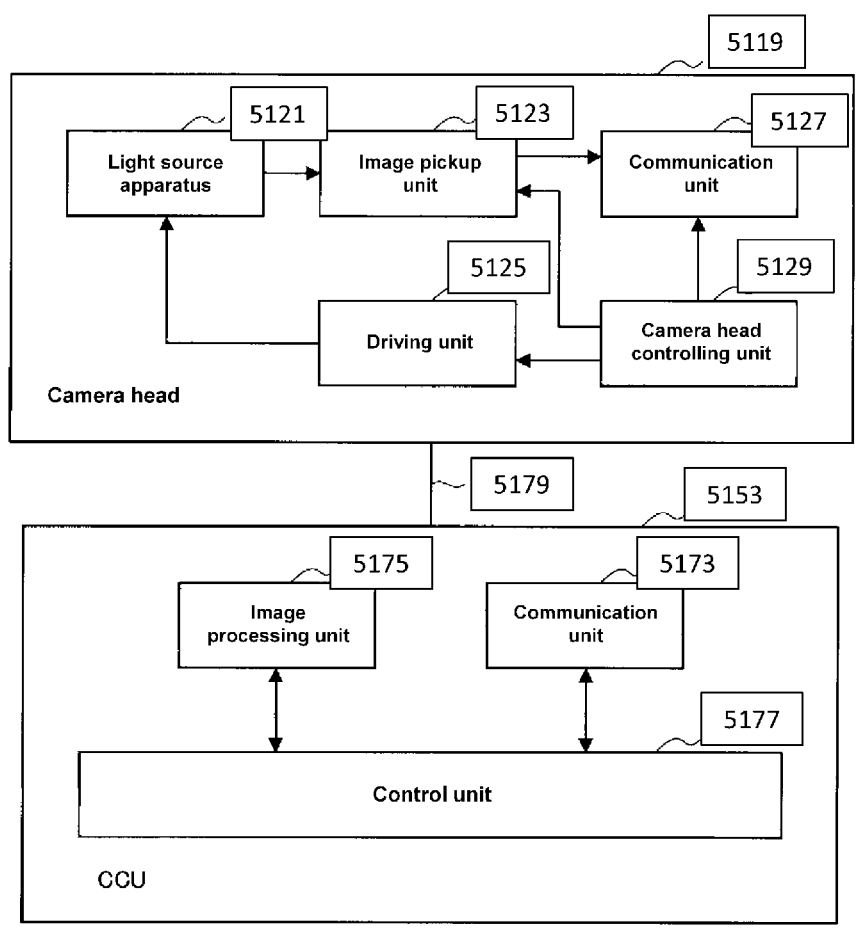
FIG. 16 is a block diagram depicting an example of a functional configuration of a camera head and a camera control unit (CCU) depicted in FIG. 15.

Functions of the camera head 5119 of the endoscope 5115 and the CCU 5153 are described in more detail with reference to FIG. 16. FIG. 16 is a block diagram depicting an example of a functional configuration of the camera head 5119 and the CCU 5153 depicted in FIG. 15.

Referring to FIG. 16, the camera head 5119 has, as functions thereof, a lens unit 5121, an image pickup unit 5123, a driving unit 5125, a communication unit 5127 and a camera head controlling unit 5129. Further, the CCU 5153 has, as functions thereof, a communication unit 5173, an image processing unit 5175 and a control unit 5177. The camera head 5119 and the CCU 5153 are connected to be bidirectionally communicable to each other by a transmission cable 5179.

First, a functional configuration of the camera head 5119 is described. The lens unit 5121 is an optical system provided at a connecting location of the camera head 5119 to the lens barrel 5117. Observation light taken in from a distal end of the lens barrel 5117 is introduced into the camera head 5119 and enters the lens unit 5121. The lens unit 5121 includes a combination of a plurality of lenses including a zoom lens and a focusing lens. The lens unit 5121 has optical properties adjusted such that the observation light is condensed on a light receiving face of the image pickup element of the image pickup unit 5123. Further, the zoom lens and the focusing lens include such that the positions thereof on their optical axis are movable for adjustment of the magnification and the focal point of a picked up image.

The image pickup unit 5123 includes an image pickup element and disposed at a succeeding stage to the lens unit 5121. Observation light having passed through the lens unit 5121 is condensed on the light receiving face of the image pickup element, and an image signal corresponding to the observation image is generated by photoelectric conversion. The image signal generated by the image pickup unit 5123 is provided to the communication unit 5127.

As the image pickup element which is included by the image pickup unit 5123, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5181 can comprehend a state of the surgical region in enhanced details and can proceed with the surgery more smoothly.

Further, the image pickup element which is included by the image pickup unit 5123 is configured such that it has a pair of image pickup elements for acquiring image signals for the right eye and the left eye compatible with 3D display. Where 3D display is applied, the surgeon 5181 can comprehend the depth of a living body tissue in the surgical region with a higher degree of accuracy. It is to be noted that, if the image pickup unit 5123 is configured as that of the multi-plate type, then a plurality of systems of lens units 5121 are provided corresponding to the individual image pickup elements of the image pickup unit 5123.

The image pickup unit 5123 may not necessarily be provided on the camera head 5119. For example, the image pickup unit 5123 may be provided just behind the objective lens in the inside of the lens barrel 5117.

The driving unit 5125 includes an actuator and moves the zoom lens and the focusing lens of the lens unit 5121 by a predetermined distance along the optical axis under the control of the camera head controlling unit 5129. Consequently, the magnification and the focal point of a picked up image by the image pickup unit 5123 can be adjusted suitably.

The communication unit 5127 includes a communication apparatus for transmitting and receiving various kinds of information to and from the CCU 5153. The communication unit 5127 transmits an image signal acquired from the image pickup unit 5123 as RAW data to the CCU 5153 through the transmission cable 5179. Thereupon, in order to display a picked up image of a surgical region in low latency, preferably the image signal is transmitted by optical communication. This is because, since, upon surgery, the surgeon 5181 performs surgery while observing the state of an affected area through a picked up image, in order to achieve surgery with a higher degree of safety and certainty, it is demanded for a moving image of the surgical region to be displayed on the real time basis as far as possible. Where optical communication is applied, a photoelectric conversion module for converting an electric signal into an optical signal is provided in the communication unit 5127. After the image signal is converted into an optical signal by the photoelectric conversion module, it is transmitted to the CCU 5153 through the transmission cable 5179.

Further, the communication unit 5127 receives a control signal for controlling driving of the camera head 5119 from the CCU 5153. The control signal includes information relating to image pickup conditions such as, for example, information that a frame rate of a picked up image is designated, information that an exposure value upon image picking up is designated and/or information that a magnification and a focal point of a picked up image are designated. The communication unit 5127 provides the received control signal to the camera head controlling unit 5129. It is to be noted that also the control signal from the CCU 5153 may be transmitted by optical communication. In this case, a photoelectric conversion module for converting an optical signal into an electric signal is provided in the communication unit 5127. After the control signal is converted into an electric signal by the photoelectric conversion module, it is provided to the camera head controlling unit 5129.

It is to be noted that the image pickup conditions such as the frame rate, exposure value, magnification or focal point are set automatically by the control unit 5177 of the CCU 5153 on the basis of an acquired image signal. In other words, an auto exposure (AE) function, an auto focus (AF) function and an auto white balance (AWB) function are incorporated in the endoscope 5115.

The camera head controlling unit 5129 controls driving of the camera head 5119 on the basis of a control signal from the CCU 5153 received through the communication unit 5127. For example, the camera head controlling unit 5129 controls driving of the image pickup element of the image pickup unit 5123 on the basis of information that a frame rate of a picked up image is designated and/or information that an exposure value upon image picking up is designated. Further, for example, the camera head controlling unit 5129 controls the driving unit 5125 to suitably move the zoom lens and the focus lens of the lens unit 5121 on the basis of information that a magnification and a focal point of a picked up image are designated. The camera head controlling unit 5129 may include a function for storing information for identifying of the lens barrel 5117 and/or the camera head 5119.

It is to be noted that, by disposing the components such as the lens unit 5121 and the image pickup unit 5123 in a sealed structure having high airtightness and high waterproof, the camera head 5119 can be provided with resistance to an autoclave sterilization process.

Now, a functional configuration of the CCU 5153 is described. The communication unit 5173 includes a communication apparatus for transmitting and receiving various kinds of information to and from the camera head 5119. The communication unit 5173 receives an image signal transmitted thereto from the camera head 5119 through the transmission cable 5179. Thereupon, the image signal may be transmitted preferably by optical communication as described above. In this case, for the compatibility with optical communication, the communication unit 5173 includes a photoelectric conversion module for converting an optical signal into an electric signal. The communication unit 5173 provides the image signal after conversion into an electric signal to the image processing unit 5175.

Further, the communication unit 5173 transmits, to the camera head 5119, a control signal for controlling driving of the camera head 5119. Also the control signal may be transmitted by optical communication.

The image processing unit 5175 performs various image processes for an image signal in the form of RAW data transmitted thereto from the camera head 5119. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5175 performs a detection process for an image signal for performing AE, AF and AWB.

The image processing unit 5175 includes a processor such as a CPU or a GPU, and when the processor operates in accordance with a predetermined program, the image processes and the detection process described above can be performed. It is to be noted that, where the image processing unit 5175 includes a plurality of GPUs, the image processing unit 5175 suitably divides information relating to an image signal such that image processes are performed in parallel by the plurality of GPUs.

The control unit 5177 performs various kinds of control relating to image picking up of a surgical region by the endoscope 5001 and display of the picked up image. For example, the control unit 5177 generates a control signal for controlling driving of the camera head 5119. Thereupon, if image pickup conditions are inputted by the user, then the control unit 5177 generates a control signal on the basis of the input by the user. Alternatively, where the endoscope 5115 has an AE function, an AF function and an AWB function incorporated therein, the control unit 5177 suitably calculates an optimum exposure value, focal distance and white balance in response to a result of a detection process by the image processing unit 5175 and generates a control signal.

Further, the control unit 5177 controls the display apparatus 5155 to display an image of a surgical region on the basis of an image signal for which the image processes have been performed by the image processing unit 5175. Thereupon, the control unit 5177 recognizes various objects in the surgical region image using various image recognition technologies. For example, the control unit 5177 can recognize a surgical tool such as forceps, a particular living body region, bleeding, mist when the energy treatment tool 5135 is used and so forth by detecting the shape, color and so forth of edges of the objects included in the surgical region image. The control unit 5177 causes, when it controls the display unit 5155 to display a surgical region image, various kinds of surgery supporting information to be displayed in an overlapping manner with an image of the surgical region using a result of the recognition. Where surgery supporting information is displayed in an overlapping manner and presented to the surgeon 5181, the surgeon 5181 can proceed with the surgery more safety and certainty.

The transmission cable 5179 which connects the camera head 5119 and the CCU 5153 to each other is an electric signal cable ready for communication of an electric signal, an optical fiber ready for optical communication or a composite cable thereof.

Here, while, in the example depicted in the figure, communication is performed by wired communication using the transmission cable 5179, the communication between the camera head 5119 and the CCU 5153 may be performed otherwise by wireless communication. Where the communication between the camera head 5119 and the CCU 5153 is performed by wireless communication, there is no necessity to lay the transmission cable 5179 in the surgery room. Therefore, such a situation that movement of medical staff in the surgery room is disturbed by the transmission cable 5179 can be eliminated.

An example of the surgery room system 5100 to which the technology according to an embodiment of the present disclosure can be applied has been described above. It is to be noted here that, although a case in which the medical system to which the surgery room system 5100 is applied is the endoscopic surgery system 5113 has been described as an example, the configuration of the surgery room system 5100 is not limited to that of the example described above. For example, the surgery room system 5100 may be applied to a soft endoscopic system for inspection or a microscopic surgery system in place of the endoscopic surgery system 5113.

The present disclosure may have the following configurations.

(1) A multi-camera system, including a first camera apparatus; a second camera apparatus; and an information processing apparatus, including a communication interface; and processing circuitry configured to receive a predetermined user input; and in response to the predetermined user input, send, via the communication interface, a first control signal to the first camera apparatus that captures a first video, and send, via the communication interface, a second control signal to the second camera apparatus that captures a second video, in which the first control signal causes the first camera apparatus to assign first unique identifiers to frames of the first video captured by the first camera apparatus, the second control signal causes the second camera apparatus to assign second unique identifiers to frames of the second video captured by the second camera apparatus, and each of the first unique identifiers assigned to the frames of the first video is associated with a different one of the second unique identifiers assigned to the frames of the second video.

(2) An information processing apparatus, including a communication interface; and processing circuitry configured to receive a predetermined user input; and in response to the predetermined user input, send, via the communication interface, a first control signal to a first camera apparatus that captures a first video, and send, via the communication interface, a second control signal to a second camera apparatus that captures a second video, in which the first control signal causes the first camera apparatus to assign first unique identifiers to frames of the first video captured by the first camera apparatus, the second control signal causes the second camera apparatus to assign second unique identifiers to frames of the second video captured by the second camera apparatus, and each of the first unique identifiers assigned to the frames of the first video is associated with a different one of the second unique identifiers assigned to the frames of the second video.

(3) The information processing apparatus according to feature (2), in which a field of view of the first camera apparatus is different from a field of view of the second camera apparatus.

(4) The information processing apparatus according to feature (2) or (3), in which the assigned first and second unique identifiers indicate one-to-one correspondences between the frames of the first video and the frames of the second video.

(5) The information processing apparatus according to any one of features (2) to (4), in which the first and second unique identifiers are the same unique identifiers.

(6) The information processing apparatus according to any one of features (2) to (5), in which the first control signal causes the first camera apparatus to assign the first unique identifiers to a number of a total number of frames of the first video, the number of frames being less than the total number of frames of the first video, and the second control signal causes the second camera apparatus to assign the second unique identifiers to the same number of frames of the second video.

(7) The information processing apparatus according to any one of features (2) to (6), in which the first control signal causes the first camera apparatus to assign the first unique identifiers in the reverse order of capture, and the second control signal causes the second camera apparatus to assign the second unique identifiers in the reverse order of capture.

(8) An information processing apparatus, including a communication interface; and processing circuitry configured to transmit, via the communication interface, a first unique identifier of a frame of a first video to a first camera apparatus, which captured the first video; receive at least one frame of the first video including the frame corresponding to the first unique identifier from the first camera apparatus in response to the transmitted first unique identifier, each of the at least one frame of the first video corresponding to a different one of a plurality of first unique identifiers; output one or more of the at least one video frame of the first video for display to a user; receive a predetermined user input during the output of the one or more of the at least one video frame of the first video for display to the user; and in response to the received predetermined user input, transmit, via the communication interface, a second unique identifier of a frame of a second video to a second camera apparatus, which captured the second video, the second unique identifier being associated with the first unique identifier of one of the at least one frame of the first video, receive at least one frame of the second video including the frame corresponding to the second unique identifier from the second camera apparatus in response to the transmitted second unique identifier, each of the at least one frame of the second video corresponding to a different one of a plurality of second unique identifiers, and output one or more of the at least one video frame of the second video for display to the user.

(9) The information processing apparatus according to feature (8), in which the field of view of the first camera apparatus is different from the field of view of the second camera apparatus.

(10) The information processing apparatus according to feature (8) or (9), in which the first and second unique identifiers are the same unique identifiers.

(11) A non-transitory computer-readable medium storing instructions which when executed by a computer cause the computer to perform a method of controlling cameras to assign unique identifiers to frames of captured video, the method including receiving a predetermined user input; and in response to the predetermined user input, send, via a communication interface, a first control signal to a first camera apparatus that captures a first video, and send, via the communication interface, a second control signal to a second camera apparatus that captures a second video, in which the first control signal causes the first camera apparatus to assign first unique identifiers to frames of the first video captured by the first camera apparatus, the second control signal causes the second camera apparatus to assign second unique identifiers to frames of the second video captured by the second camera apparatus, and each of the first unique identifiers assigned to the frames of the first video is associated with a different one of the second unique identifiers assigned to the frames of the second video.

(12) The non-transitory computer-readable medium according to feature (11), in which a field of view of the first camera apparatus is different from a field of view of the second camera apparatus.

(13) The non-transitory computer-readable medium according to feature (11) or (12), in which the assigned first and second unique identifiers indicate one-to-one correspondences between the frames of the first video and the frames of the second video.

(14) The non-transitory computer-readable medium according to any of features (11) to (13), in which the first and second unique identifiers are the same unique identifiers.

(15) The non-transitory computer-readable medium according to any one of features (11) to (14), in which the first control signal causes the first camera apparatus to assign the first unique identifiers to a number of a total number of frames of the first video, the number of frames being less than the total number of frames of the first video, and the second control signal causes the second camera apparatus to assign the second unique identifiers to the same number of frames of the second video.

(16) The non-transitory computer-readable medium according to any of features (11) to (15), in which the first control signal causes the first camera apparatus to assign the first unique identifiers in the reverse order of capture, and the second control signal causes the second camera apparatus to assign the second unique identifiers in the reverse order of capture.

(17) A non-transitory computer-readable medium storing instructions which when executed by a computer cause the computer to perform a method of playing back video recorded by a plurality of cameras, the method including transmitting, via a communication interface, a first unique identifier of a frame of a first video to a first camera apparatus, which captured the first video; receiving at least one frame of the first video including the frame corresponding to the first unique identifier from the first camera apparatus in response to the transmitted first unique identifier, each of the at least one frame of the first video corresponding to a different one of a plurality of first unique identifiers; output one or more of the at least one video frame of the first video for display to a user; receive a user input during the output of the one or more of the at least one video frame of the first video for display to the user; and in response to the received user input, transmit, via the communication interface, a second unique identifier of a frame of a second video to a second camera apparatus, which captured the second video, the second unique identifier being associated with the first unique identifier of one of the at least one frame of the first video, receive at least one frame of the second video including the frame corresponding to the second unique identifier from the second camera apparatus in response to the transmitted second unique identifier, each of the at least one frame of the second video corresponding to a different one of a plurality of second unique identifiers, and output one or more of the at least one video frame of the second video for display to the user.

(18) The non-transitory computer-readable medium according to feature (17), in which the field of view of the first camera apparatus is different from the field of view of the second camera apparatus.

(19) The non-transitory computer-readable medium according to feature (17) or (18), in which the first and second unique identifiers are the same unique identifiers.

The present disclosure may also have the following configurations.

(1) A multi-camera system, including:
a plurality of cameras; and
a confirmation apparatus connected via wire or wirelessly to the plurality of cameras, each of the cameras including
an imager,
a memory that writes image data of frames captured by the imager, and
a control unit that controls processing of, when receiving an end trigger signal from the confirmation apparatus, assigning frame numbers to the frames within a predetermined past time period starting from the frame corresponding to a timing of receiving the end trigger signal, and processing of, when receiving a transfer request including the frame number from the confirmation apparatus, reading the image data of the frame specified by the frame number from the memory and transferring to the confirmation apparatus,
the confirmation apparatus including
a display, and
a control unit that controls processing of sending the end trigger signal to each of the plurality of cameras, processing of sending the transfer request including the frame number to a predetermined camera selected from the plurality of cameras, and processing of receiving the image data of the frame specified by the frame number transferred from the predetermined camera, and displaying an image of the image data on the display.

(2) The multi-camera system according to (1), in which
the plurality of cameras capture images of a same object at different angles.

(3) A camera, including:
an imager;
a memory that writes image data of frames captured by the imager; and
a control unit that controls processing of, when receiving an end trigger signal from the confirmation apparatus, assigning frame numbers to the frames within a predetermined past time period starting from the frame corresponding to a timing of receiving the end trigger signal, and processing of, when receiving a transfer request including the frame number from the confirmation apparatus, reading the image data of the frame specified by the frame number from the memory and transferring to the confirmation apparatus.

(4) The camera according to (3), in which
the image data of the frames is intraframe-compressed, and is written into the memory, and
the intraframe-compressed image data of the frame specified by the frame number is transferred to the confirmation apparatus.

(5) The camera according to (3) or (4), in which
the image data of each frame is loop-recorded in the memory for at least predetermined time or longer.

(6) A processing method of a camera, the camera including an imager and a memory that writes image data of frames captured by the imager, the method including the steps of:
when receiving an end trigger signal from a confirmation apparatus, assigning frame numbers to the frames within a predetermined past time period starting from the frame corresponding to a timing of receiving the end trigger signal; and
when receiving a transfer request including a frame number from the confirmation apparatus, reading the image data of the frame specified by the frame number from the memory and transferring the image data to the confirmation apparatus.

(7) A confirmation apparatus, including:
a display; and
a control unit that controls processing of sending the end trigger signal to each of the plurality of cameras, processing of sending the transfer request including the frame number to a predetermined camera selected from the plurality of cameras, and processing of receiving the image data of the frame specified by the frame number transferred from the predetermined camera, and displaying an image of the image data on the display.

(8) The confirmation apparatus according to (7), further including:
an operation part configured to switch an image taken by the predetermined camera to an image taken by the other camera.

(9) The confirmation apparatus according to (8), in which
the operation part is a touch panel arranged on a screen of the display.

(10) The confirmation apparatus according to claim 9, in which
a button and/or a scroll bar configured to switch the image taken by the predetermined camera to the image taken by the other camera is displayed on the display.

(11) A processing method of a confirmation apparatus, the confirmation apparatus including a display, the method including the steps of:
sending an end trigger signal to each of a plurality of cameras;
sending a transfer request including a frame number to a predetermined camera selected from the plurality of cameras; and
receiving image data of the frame specified by the frame number transferred from the predetermined camera, and displaying an image of the image data on the display.

REFERENCE SIGNS LIST

10A, 10B, 10C, 10D multi-camera system
101, 101-A, 101-B, and 101-C camera
102 confirmation apparatus
103-A, 103-B, 103-C control device
111 CPU
112 memory
113 imager/lens
114 camera signal processing unit
115 codec processing unit
116 panel processing unit
117 panel
118 wired communication processing unit
119 wired LAN terminal
120 wireless communication processing unit
121 antenna
131 CPU
132 memory
133 codec processing unit
134 graphic processing unit
135 panel processing unit
136 panel
137 wired communication processing unit
138 wired LAN terminal
139 wireless communication processing unit
140 antenna

The invention claimed is:

1. A multi-camera system, comprising:
a first camera apparatus;
a second camera apparatus; and
an information processing apparatus, including
a communication interface; and
processing circuitry configured to:
receive a predetermined user input; and
in response to the predetermined user input,
send, via the communication interface, a first control signal to the first camera apparatus that captures a first video, and
send, via the communication interface, a second control signal to the second camera apparatus that captures a second video, wherein
the first control signal causes the first camera apparatus to assign first unique identifiers to frames of the first video captured by the first camera apparatus and recorded in a frame buffer of the first camera apparatus,
the second control signal causes the second camera apparatus to assign second unique identifiers to frames of the second video captured by the second camera apparatus and recorded in a frame buffer of the second camera apparatus,
each of the first unique identifiers assigned to the frames of the first video is associated with a different one of the second unique identifiers assigned to the frames of the second video,
the first unique identifiers and the second unique identifiers include frame numbers,
a first numbered frame in the frame buffer of the first camera apparatus corresponds to a timing of reception of the first control signal, and
a first numbered frame in the frame buffer of the second camera apparatus corresponds to a timing of reception of the second control signal.

2. An information processing apparatus, comprising:
a communication interface; and
processing circuitry configured to:
receive a predetermined user input; and
in response to the predetermined user input,
send, via the communication interface, a first control signal to a first camera apparatus that captures a first video, and
send, via the communication interface, a second control signal to a second camera apparatus that captures a second video, wherein
the first control signal causes the first camera apparatus to assign first unique identifiers to frames of the first video captured by the first camera apparatus and recorded in a frame buffer of the first camera apparatus,
the second control signal causes the second camera apparatus to assign second unique identifiers to frames of the second video captured by the second camera apparatus and recorded in a frame buffer of the second camera apparatus,
each of the first unique identifiers assigned to the frames of the first video is associated with a different one of the second unique identifiers assigned to the frames of the second video,
the first unique identifiers and the second unique identifiers include frame numbers,
a first numbered frame in the frame buffer of the first camera apparatus corresponds to a timing of reception of the first control signal, and
a first numbered frame in the frame buffer of the second camera apparatus corresponds to a timing of reception of the second control signal.

3. The information processing apparatus according to claim 2, wherein
a field of view of the first camera apparatus is different from a field of view of the second camera apparatus.

4. The information processing apparatus according to claim 2, wherein the assigned first and second unique identifiers indicate one-to-one correspondences between the frames of the first video and the frames of the second video.

5. The information processing apparatus according to claim 2, wherein the first and second unique identifiers are the same unique identifiers.

6. The information processing apparatus according to claim 2, wherein
the first control signal causes the first camera apparatus to assign the first unique identifiers to a first number of frames of a total number of frames of the first video, the first number of frames being less than the total number of frames of the first video,
the second control signal causes the second camera apparatus to assign the second unique identifiers to a second number of frames of the second video, and
the first number of frames is equal to the second number of frames.

7. The information processing apparatus according to claim 2, wherein
the first control signal causes the first camera apparatus to assign the first unique identifiers in a reverse order of capture, and
the second control signal causes the second camera apparatus to assign the second unique identifiers in a reverse order of capture.

8. An information processing apparatus, comprising:
a communication interface; and
processing circuitry configured to:
transmit, via the communication interface, a first unique identifier of a frame of a first video to a first camera apparatus, which captured the first video;
receive one or more frames of the first video including the frame corresponding to the first unique identifier from the first camera apparatus in response to the transmitted first unique identifier, each of the one or more received frames of the first video corresponding to a different one of a plurality of first unique identifiers;
output the one or more received frames of the first video for display to a user;
receive a predetermined user input during the output of the one or more received frames of the first video for display to the user; and
in response to the received predetermined user input,
transmit, via the communication interface, a second unique identifier of a frame of a second video to a second camera apparatus, which captured the second video and recorded the frame in a frame buffer of the second camera apparatus, the second unique identifier being associated with the first unique identifier of the frame of the first video,
receive, from the frame buffer of the second camera apparatus, one or more frames of the second video including the frame corresponding to the second unique identifier from the second camera apparatus in response to the transmitted second unique identifier, each of the one or more received frames of the second video corresponding to a different one of a plurality of second unique identifiers, and output the one or more received frames of the second video for display to the user, wherein the first unique identifiers and the second unique identifiers include frame numbers, and wherein the frame corresponding to the second unique identifier from the second camera apparatus is a first numbered frame in the frame buffer of the second camera apparatus corresponding to a timing of reception of the predetermined user input.

9. The information processing apparatus according to claim 8, wherein a field of view of the first camera apparatus is different from a field of view of the second camera apparatus.

10. The information processing apparatus according to claim 8, wherein wherein the first and second unique identifiers are the same unique identifiers.

11. A non-transitory computer-readable medium storing instructions which when executed by a computer cause the computer to perform a method of controlling cameras to assign unique identifiers to frames of captured video, the method comprising:

receiving a predetermined user input; and in response to the predetermined user input, send, via a communication interface, a first control signal to a first camera apparatus that captures a first video, and send, via the communication interface, a second control signal to a second camera apparatus that captures a second video, wherein the first control signal causes the first camera apparatus to assign first unique identifiers to frames of the first video captured by the first camera apparatus and recorded in a frame buffer of the first camera apparatus, the second control signal causes the second camera apparatus to assign second unique identifiers to frames of the second video captured by the second camera apparatus and recorded in a frame buffer of the second camera apparatus, and each of the first unique identifiers assigned to the frames of the first video is associated with a different one of the second unique identifiers assigned to the frames of the second video, the first unique identifiers and the second unique identifiers include frame numbers, a first numbered frame in the frame buffer of the first camera apparatus corresponds to a timing of reception of the first control signal, and a first numbered frame in the frame buffer of the second camera apparatus corresponds to a timing of reception of the second control signal.

12. The non-transitory computer-readable medium according to claim 11, wherein a field of view of the first camera apparatus is different from a field of view of the second camera apparatus.

13. The non-transitory computer-readable medium according to claim 11, wherein the assigned first and second unique identifiers indicate one-to-one correspondences between the frames of the first video and the frames of the second video.

14. The non-transitory computer-readable medium according to claim 11, wherein the first and second unique identifiers are the same unique identifiers.

15. The non-transitory computer-readable medium according to claim 11, wherein the first control signal causes the first camera apparatus to assign the first unique identifiers to a first number of frames of a total number of frames of the first video, the first number of frames being less than the total number of frames of the first video, the second control signal causes the second camera apparatus to assign the second unique identifiers to a second number of frames of the second video, and the first number of frames is equal to the second number of frames.

16. The non-transitory computer-readable medium according to claim 11, wherein the first control signal causes the first camera apparatus to assign the first unique identifiers in a reverse order of capture, and the second control signal causes the second camera apparatus to assign the second unique identifiers in a reverse order of capture.

17. A non-transitory computer-readable medium storing instructions which when executed by a computer cause the computer to perform a method of playing back video recorded by a plurality of cameras, the method comprising:

transmitting, via a communication interface, a first unique identifier of a frame of a first video to a first camera apparatus, which captured the first video;

receiving one or more frames of the first video including the frame corresponding to the first unique identifier from the first camera apparatus in response to the transmitted first unique identifier, each of the one or more received frames of the first video corresponding to a different one of a plurality of first unique identifiers;

outputting the one or more received frames of the first video for display to a user;

receiving a predetermined user input during the output of the one or more received frames of the first video for display to the user; and in response to the received predetermined user input, transmitting, via the communication interface, a second unique identifier of a frame of a second video to a second camera apparatus, which captured the second video and recorded the frame in a frame buffer of the second camera apparatus, the second unique identifier being associated with the first unique identifier of the frame of the first video, receiving, from the frame buffer of the second camera apparatus, one or more frames of the second video including the frame corresponding to the second unique identifier from the second camera apparatus in response to the transmitted second unique identifier, each of the one or more received frames of the second video corresponding to a different one of a plurality of second unique identifiers, and outputting the one or more received frames of the second video for display to the user, wherein the first unique identifiers and the second unique identifiers include frame numbers, and wherein the frame corresponding to the second unique identifier from the second camera apparatus is a first numbered frame in the frame buffer of the second camera apparatus corresponding to a timing of reception of the predetermined user input.

18. The non-transitory computer-readable medium according to claim 17, wherein a field of view of the first camera apparatus is different from a field of view of the second camera apparatus.

19. The non-transitory computer-readable medium according to claim 17, wherein the first and second unique identifiers are the same unique identifiers.

20. The multi-camera system of claim 1, wherein the first unique identifiers and the second unique identifiers are assigned in a reverse order of capture.

* * * * *